US011263592B2

(12) United States Patent
Dotan-Cohen et al.

(10) Patent No.: US 11,263,592 B2
(45) Date of Patent: Mar. 1, 2022

(54) MULTI-CALENDAR HARMONIZATION

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Haim Somech, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 526 days.

(21) Appl. No.: 15/863,975

(22) Filed: Jan. 7, 2018

(65) Prior Publication Data
US 2019/0213557 A1 Jul. 11, 2019

(51) Int. Cl.
*G06Q 10/10* (2012.01)
*H04L 29/08* (2006.01)
*H04L 67/50* (2022.01)
*H04L 67/1095* (2022.01)

(52) U.S. Cl.
CPC ......... *G06Q 10/1093* (2013.01); *H04L 67/22* (2013.01); *H04L 67/1095* (2013.01)

(58) Field of Classification Search
CPC .. G06Q 10/1093; H04L 67/1095; H04L 67/22
See application file for complete search history.

(56) References Cited

U.S. PATENT DOCUMENTS

| 2006/0190313 A1* | 8/2006 | Lu ........................... G06Q 20/10 705/7.19 |
| 2009/0054091 A1* | 2/2009 | van Wijk ................. H04L 67/24 455/466 |
| 2010/0004971 A1* | 1/2010 | Lee ....................... G06Q 10/109 705/7.13 |
| 2012/0084286 A1* | 4/2012 | Hubner .............. G06Q 10/1093 707/737 |

(Continued)

OTHER PUBLICATIONS

"Take Control of Calendar Syncing and Sharing with BusyCal (1.1)", by Joe Kissel, TidBITS Publishing Inc. 2013. (Year: 2013).*

(Continued)

*Primary Examiner* — Pan G Choy
(74) *Attorney, Agent, or Firm* — Shook, Hardy and Bacon, L.L.P.

(57) ABSTRACT

Computerized systems for synchronizing multiple calendars are provided. User activity is monitored via sensors and user devices associated with the user. Monitoring user activity includes detecting calendar activity associated with a set of calendars that includes a first calendar. A first calendar event associated with the first calendar is detected. A second calendar included in the set of calendars and associated with the first event is determined. The second calendar is determined based on the user activity, the first calendar, or the first event. The second calendar may be determined based on a synchronization profile associated with the first calendar. The second calendar is updated to include at least a portion of the first event. The first event is synchronized and/or shared with the second calendar. Only selective portions of the event data of the first event may be provided to the second calendar.

20 Claims, 11 Drawing Sheets

(56) References Cited

U.S. PATENT DOCUMENTS

| | | |
|---|---|---|
| 2014/0067455 A1 | 3/2014 | Zhang et al. |
| 2014/0185417 A1* | 7/2014 | Zhao .................... G06Q 10/109 368/28 |
| 2016/0078412 A1* | 3/2016 | Feliberti ............ G06Q 10/1095 705/7.19 |
| 2016/0189109 A1* | 6/2016 | Le ...................... G06Q 10/1095 705/7.19 |
| 2016/0275458 A1 | 9/2016 | Meushar et al. |
| 2016/0342955 A1* | 11/2016 | Brock ..................... H04L 67/02 |
| 2019/0052728 A1* | 2/2019 | Cheng ..................... H04L 67/22 |

OTHER PUBLICATIONS

"Microsoft Outlook 2000—Calendar & Tasks" Student Guide, Binghamton University, Oracle Corporation, Nov. 2, 2001. (Year: 2001).*

"Calendar and Docket Control" Risk Management Practice Guide of Lawyers Mutual, Liability Insurance Company of North Carolina. Oct. 2016 (Year: 2016).*

"International Search Report and Written Opinion Issued in PCT Application No. PCT/US2018/066100", dated Feb. 28, 2019, 11 Pages.

* cited by examiner

MULTI-CALENDAR HARMONIZATION

BACKGROUND

A variety of computer-implemented meeting, scheduling, and calendaring solutions are available to assist users in planning and organizing their schedules. In some cases, calendar items, such as calendar events, may be placed on or included within a calendar by the user, or by some other application. When placed on or included within a calendar, the calendar event may be displayed for one or more users. The display of these calendar events may indicate meetings the user typically attends in person, or via telephone or some online meeting application, or may be a calendar event that is merely optional or informational only. Calendar events often have a context. For instance, a calendar event may be a work-related event, a family-related event, a social-related event, or some other type of event.

Calendar events often include information, e.g., event data. Such event data may include the time, duration, date, location (physical or virtual), and/or attendees for the meeting. Event data may include other information, such as the event context, subject or topic of the meeting, copies of or links to documents or other materials to be discussed at the meeting, the user's role or responsibilities for the meetings, action items, checklists, or the like. When a calendar event is displayed within a calendar, at least a portion of the event data may be displayed for the user.

Users often employ more than one calendar for events of different contexts. As such, a calendar may have a context for a user. For example, a user may employ a work-related calendar for work-related events, a family-related calendar for family-related events, and a social-related calendar for social-related events. A calendar may be an individual calendar, such that only a single user may view and/or edit the calendar, while other calendars are shared calendars that more than one user may view and/or edit. For instance, a user's work-related calendar may be an individual calendar, viewable only to the user, while the user's family-related calendar is shared with the other members of the user's family, such that each family member may view and/or edit the calendar.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of this disclosure relate to computerized systems for providing a personalized computing experience for a user of the technologies described herein by providing methods and systems for synchronizing of multiple computer-implemented calendars. In one non-limiting embodiment, a method for synchronizing the calendars includes monitoring user activity from sensors and user devices associated with the user. Monitoring user activity may include detecting calendar activity associated with a set of computer-implemented calendars that includes at least a first calendar. The method detects a first event that is a calendar event associated with the first calendar. A second calendar that is included in the set of calendars and is associated with the first event is determined. The second calendar is determined based on the user activity, the first calendar, or the first event. The second calendar may be determined based on a synchronization profile associated with the first calendar. The second calendar is updated to include at least a portion of the first event. In some embodiments, the first calendar is a primary calendar of the event and the second calendar is a secondary calendar for the event. The first event may be included in the first calendar and may be synchronized and/or shared with the second calendar, or may influence scheduling of events on the second calendar, for instance, by indicating via the second calendar that a user is unavailable during the time of the first event. In the various embodiments, any calendar may influence any other calendar. For instance, a second event may be included in the second calendar. The first calendar may be synchronized with the second calendar, such that the second event is included and/or shared with the second calendar. In some embodiments, the concepts of primary and secondary calendars may not apply. That is, each calendar may influence each other calendar.

In various embodiments, only portions of the event data of the first event are provided to the second calendar. For instance, a portion of the event data included in the first event is displayed in the first calendar and access to the portion of the event data is restricted from the second calendar. Because access to the portion of the event data is restricted from the second calendar, the portion may be referred to as a restricted portion of event data. The determination of the restricted portion may be based on the context of the first event, the context of the first calendar, the context of the second calendar, or the monitored user activity. In one embodiment, the restricted portion is determined based on a synchronization profile associated with the first calendar or the second calendar. Another portion of the event activity may be provided to both the first calendar and the second calendar. Such a portion of event data may be referred to as a shared portion. The shared portion of event data may be determined based on the context of the first event, the context of the first calendar, the context of the second calendar, or the monitored user activity. In one embodiment, the shared portion is determined based on the synchronization profile associated with the first calendar or the second calendar.

In response to or after updating the second calendar, a second user that is enabled to view the second calendar may be provided a notification or alert that the second calendar has been updated. The method may determine a location of the first event and update at least the start time or the stop time of the first event based on the location. That is, the embodiments may "pad" the time of the event based on the location of the event, to allow a user time to get to or from the first event based on adjacent calendar events, a user's routine location at that time of day, or the like.

In various embodiments, the method may detect and resolve temporal and/or spatial multiple-event and/or multiple-user conflicts. For instance, the method may detect a second event included in the second calendar. In response to the detection of the second event, a temporal and/or spatial conflict between the first and second events may be detected. The conflict may be resolved by providing, to the user, a suggestion of at least one of an alternative date, time, or location for the first or second events.

In addition to resolving conflicts, the various embodiments may act has an event scheduler. For instance, the method may determine a first schedule based on the first calendar. The first schedule may be a schedule of the user. The method may determine a second schedule based on the second calendar. The second schedule may be a schedule of a second user. The various embodiments may determine at least one of a date, a time, or a location for a second event based on the first and second schedules.

Resolving conflicts and scheduling events may be based on user-associated weights and/or event-associated weights. For instance, when resolving a multi-event or a multi-user conflict, a first weight associated with the user and a second weight associated with a second user may be determined. Scheduling a second event may be based on the first calendar, the second calendar, the first weight, and the second weight. In another embodiment, a first weight may be associated with the first event and the second weight is associated with the second event. A third event may be scheduled based on the first calendar, the second calendar, the first weight, and the second weight.

In some embodiments, the updating of the second calendar to include the first event is fully automatic. In other embodiments, updating the second calendar requires verification by the user. For example, in one embodiment, in response to determining the second calendar, the user is provided with an option to include the first event in the second calendar. In such embodiments, the option may be provided via a notification that indicates the first event and the second calendar. In response to receiving the user selection of the option, affirming the user's verification, the second calendar may be updated.

Updates to the first event may be automatically provided to the first calendar, as well as the second calendar. For instance, the various embodiments may detect an update to the first event. The update may include an update to the date, start time, stop time, or location of the first event. The second calendar may be automatically updated to include the updated date, start time, stop time, or location of the first event.

BRIEF DESCRIPTION OF THE DRAWINGS

Aspects of the disclosure are described in detail below with reference to the attached drawing figures, wherein.

DETAILED DESCRIPTION

Figure 1A:
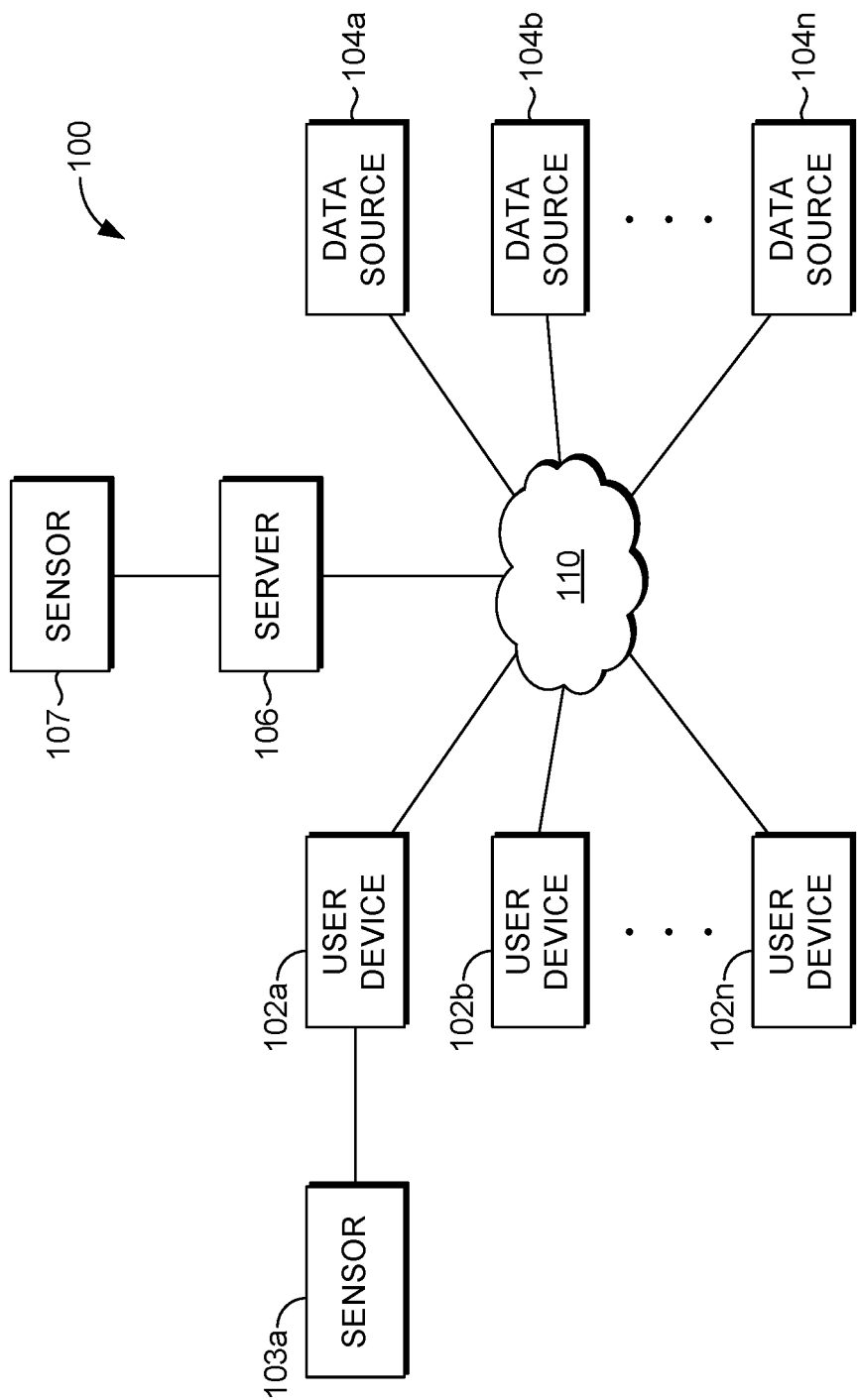
FIG. 1A is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

The coalescence of telecommunications and computing technologies in the modern era has enabled, for the first time in human history, nearly constant communication and access to personal-, family-, social-, and work-related resources through a ubiquity of personal computing resources (including personal computing devices and cloud-computing coupled with communication networks). It is now commonplace for a person to multitask, and be simultaneously engaged with, or at least conscious of, personal-, family-, social-, and/or work-related tasks or events. As a result, new computer technologies are emerging for tailoring computing services and information delivery to users, based on circumstances or other information that is specific to those users. Such personalization of computing services can provide information to one or more users. Such provided information may be specifically relevant to a user, his individual schedule, and routines.

Aspects of this disclosure provide a personalized computing experience for a user of the technologies described herein by providing enhanced systems and methods for harmonizing and/or synchronizing multiple computer-implemented calendars, such as computer applications or services for a calendar, meeting organization or handling, or scheduling. As such, one aspect of the embodiments includes harmonizing, or at least partially synchronizing, multiple individual and/or shared calendars. As discussed throughout, such synchronization may include automatically adding and/or deleting events to/from one or more calendars based on the addition/deletion of the event in another calendar. Additionally, when event data for the event is updated or edited in one calendar, the updated event data is synchronized across the other calendars. For an event that is automatically added/deleted/updated in a calendar that is separate from the calendar in which the event was originally created, the event may be referred to as a shared and/or synchronized event. As used throughout, an event, or more specifically calendar information about an event, may indicate one calendar as a primary calendar for the event and one or more other calendars as secondary calendars for the event.

The primary calendar for an event may refer to the calendar in which the event was initially created and/or added. A secondary calendar for the event may be any other calendar in which the event is shared and/or synchronized. Thus, in the various embodiments, the contents of one calendar may automatically influence the contents of one or more other calendars via shared and/or synchronized events. In at least some of the embodiments, to secure sensitive information associated with a shared event, some event data of the shared event may not be accessible and/or viewable in at least some of the calendars.

In the various embodiments, in an event's primary calendar and/or any of the event's secondary calendars, the duration of the event may be automatically "padded" or extended to account for a user's travel time to and from the event. That is, the various embodiments may analyze the spatial proximity of the locations of two or more events in one or more calendars, where the user may be attending both events. The embodiments may move the start time and/or the end time of at least one of the two events to account for the user's travel time between the events. Such "padded" time for the event may selectively appear in any calendar with which the event is shared and/or synchronized.

Synchronization also may include detecting and resolving conflicts between two or more events, where at least one of the events is included in the one or more calendars. Resolving such conflicts may include providing recommendations for alternative dates, times, locations, and the like for the conflicting events. As such, the synchronization of multiple calendars discussed herein enables scheduling services for events that are relevant to a large number of users, wherein each user has a separate schedule as indicated in one or more calendars used by the user. "Padded" event time may be used in the various analysis for detecting and resolving conflicts, as well as scheduling events.

In one exemplary but non-limiting embodiment, when a first calendar event is generated and associated with (i.e., added to) a first calendar, the first calendar event (or at least a modified version of the first calendar event) is automatically added to and/or associated with a second calendar. That is, the event is shared or synchronized from the first calendar (i.e., the primary calendar) to the second calendar (i.e., the secondary calendar). Such calendar harmonization and/or synchronization may be based on one or more synchronization profiles for the first and second calendars.

For instance, when a user adds a work event to his work calendar, the work event may be automatically added to, or associated with, his family calendar. As such, other users enabled to view the family calendar, such as members of the user's family, are automatically informed of the user's non-availability due to the work event. When the event data (such as the date and/or time) for the first event is updated in the first calendar, the updated event data may be automatically accessible to the second calendar. Likewise, when the first event is deleted from the first calendar, the event may be automatically deleted from the second calendar.

In some scenarios, a user may wish to inform his family, or other users, of portions of information (i.e., event data) associated with one or more calendar events via calendar synchronization, while restricting access to and/or visibility of other information associated with the synchronized calendar events. For instance, a user may wish to share a time, duration, and date of a work meeting with his family. However, the user may wish to restrict his family members from viewing confidential or sensitive information included in the calendar event. Calendar event data that the user may wish to restrict the accessibility of includes, but is not otherwise limited to, the location of the meeting (physical or virtual), subject of the meeting, or documents and/or topics to be reviewed at the meeting. In some embodiments, the "padded" start and/or stop times of an event may be made available to the family calendar. In one embodiment, only the "padded" start and stop times are accessible to the family calendars, i.e., the users of the family calendar may view only the "padded" times for an event and not view the actual times of an event. In this way, the user may inform his family of their general availability, while not disclosing actual times for an event.

Accordingly, when calendars are synchronized in the various embodiments, only a selective portion of the event data may be accessible or made available to the other calendars. That is, the various embodiments selectively restrict portions of the event data of the automatically synchronized calendar events to at least some of the calendars that are synchronized via the event.

In some non-limiting embodiments, an event may include an identification of a primary calendar and identification for one or more other secondary calendars for which to synchronize or share the event. Typically, although non-essentially, each item of event data for the event is accessible to the primary calendar, while the accessibility of some of the items of the event data may be restricted from at least some of the secondary calendars. The items of event data to make accessible to a secondary calendar, and the items to restrict accessibility to the secondary calendar, may be indicated in a synchronization profile for the primary and the secondary calendars.

The calendar in which the event was initially added and/or generated may default to the primary calendar for the event, while the other calendars that are associated with the event are secondary calendars for the event. However, in some embodiments, the user may update the assignment of the primary calendar for an event. For instance, for an event initially created in a work calendar and shared with a family calendar, the user may edit the event such that the family calendar is the primary calendar for the event and the user's work calendar is a secondary calendar for the event.

In this way, based on the customization of one or more synchronization profiles, any combination of individual and/or shared calendars may be automatically synchronized. Furthermore, the synchronization profiles may be automatically customized via machine learning and/or artificial intelligent agents. That is, via the monitoring and analyzing of user behavior and preferences, the synchronization profiles may be updated to account for patterns regarding the user's synchronization requirements. Via such monitoring, the various embodiments may infer synchronization pattern features, which are employed to automatically generate and/or update a synchronization profile. Accordingly, the user's manual effort required with the management and maintenance of multiple calendars is diminished over time.

As discussed above, the embodiments enable a user to automatically provide other users with visibility into his schedule, without exposing particular information about events included in his schedule. As such, the user may safeguard sensitive information about an event in his schedule, while providing other users less sensitive information about the event, such as a date and (padded or non-padded) time of the event. By providing such visibility, the embodiments may detect and resolve conflicts between multiple events for multiple users. For example, a user may have a first event at a first time that is included in a first calendar. The user may have a second event, included in a second calendar at a second time, that is equivalent or similar to the first time of the first event. Due to the synchronization of the first and second calendars, various embodiments are enabled to detect the temporal conflict associated with the first and second events. Such conflicts may be referred to as multiple-event conflicts.

In addition to the automatic detection of temporal multiple-event conflicts for a user, the embodiments may mediate and resolve such temporal conflicts by providing alternative dates and/or times for at least one of the first event or the second event. By synchronizing the events across multiple calendars, the various embodiments have visibility to the schedule of a user, as indicated by the user's multiple calendars. As such, alternative dates and/or times that resolve the temporal multiple-event conflict may be automatically determined and suggested to the user.

Such embodiments may also detect and resolve spatial multiple-event conflicts for the user when the first event occurs at a first location and the second event occurs at a second location. The first time of the first event may occur prior to the second time of the second event, such that a temporal gap exists between the ending time of the first event and the starting time of the second event. However, the first and second locations may be separated by a physical distance where the user may not be able to travel from the first location to the second location within the temporal gap between the first and second meetings. The embodiments are enabled to detect and resolve such spatial multiple-event conflicts for the user by recommending alternative locations for at least the first event or the second event. Thus, the various embodiments are enabled to detect and resolve temporal and/or spatial multiple-event conflicts for a user by recommending alternative times, dates, and locations for conflicting events that the user is interest in. That is, the embodiments detect and resolve temporal/spatial conflicts for an individual user that is interested in the conflicting multiple events.

By providing such visibility into multiple users' schedules distributed across one or more calendars, the various embodiments may act as an event schedule optimizer. More particularly, the embodiments detect and resolve temporal/spatial conflicts for multiple users interested in a single event. That is, the embodiments may determine an optimal date, time, and location for an event, that multiple users are interested in, wherein each user has a separate schedule indicated in one or more calendars. In addition to the schedules of each of the interested users, such schedule optimization may be based on weights or priorities assigned to each of the interested users. That is, the schedules of some users may be weighted more heavily than the schedules of other users. For example, users whose attendance to a meeting is essential may be associated with a higher weight than users whose attendance is optional. Furthermore, such embodiments may detect and resolve scheduling conflicts involving multiple events and/or multiple users based on the users' schedules and associated weights.

That is, in addition to the detection and resolution of multiple-event conflicts, the various embodiments are enabled to detect and resolve multiple-user conflicts. Detecting and resolving multiple-user conflicts may be referred to as event scheduling. Note that when detecting and resolving conflicts for multiple users, the various embodiments may also be detecting and resolving multiple-event conflicts for each of the multiple users. Also, the padded duration of the events may be used in any conflict detection and resolution employed in the various embodiments.

In various embodiments, conflict detection and resolution may additionally and/or alternatively include "event conflation," or simply "conflation" aspects. In such embodiments, the various systems or methods may determine that an identified conflict is a conflict between two or more events that are the same, or at least similar, events. For example and without limitation, a first parent may add an event, such as a parent-teacher conference meeting to their work calendar. The first parent may title the event "child's school conference." A second parent may add an event, pertaining to the same parent-teacher conference, to the family calendar, as a different and/or separate event. For instance, the second parent may add an event to the family calendar at a similar time and/or date, and title the event "Meeting with kid's teacher." In this scenario, some embodiments of the system may analyze the first parent's work calendar and the family calendar. For instance, the features of both calendar events may be compared in the analysis and a similarity determined between the events may be determined. In this example, because the features, such as the event time, event title, and key words in the title are similar (e.g., child and kid, meeting and conference, teacher and school), the system may determine that the "child's school conference" in the work calendar is likely the same event as the "meeting with kid's teacher" event in the family calendar. Upon determining that the two events are likely the same event, the system may conflate the two events into a single event. In some embodiments a similarity threshold may be used to determine similarity, and if the likelihood of similarity is not sufficient to satisfy the threshold, the events may be determined to be different (or if the similarity is close to the threshold, the user—such as one of parents—may be prompted with a notification that the event already appears to be on the calendar). Upon performing the conflation, the system may automatically update one or both of the work and family calendars to indicate that the event conflation. In some embodiments, an alert may be provided to the users that a conflation has been identified and/or resolved. The conflation analysis may be based on the date, time, attendees, location, subject, or any other features or data pertaining to the multiple events.

In one non-limiting exemplary embodiment, a musician is planning a performance and would like to determine an optimal date, time, and/or location for a group of users, wherein each user of the group is interested in attending the performance. Each calendar associated with each interested user may be synchronized with another calendar associated with the concert. The various embodiments enable each user to provide their availability via the calendar synchronization, while safeguarding specific information about their schedules that the users may wish to keep restricted or private. For instance, each user may share the date, time, and location for each event included in his calendar with the concert calendar, while restricting access to other event data, such as event title, attendee list, and the like. The embodiments may determine an optimal date, time, and location for the concert based on the shared availability (time, data, and location) for each interested user.

When determining the optimal date, time, and location for the concert, weights for each user may be employed. The weights may reflect a probability or Bayesian-determined belief that the user will indeed attend the concert. The schedules of the users that are more likely to actually attend the concert may be weighted more heavily than the schedules of users that are less likely to attend the concert. The weights may depend upon the user's physical proximity (as determined via the user's home or location as indicated via their shared schedule). For instance, the schedules of the users with home addresses or schedules that indicate that the user tends to be physically closer to a theater may be weighted more heavily than the schedules of users that are likely to be further away from the theater.

The weights may be based on the user's previous concert attendance records, whether a user has joined an online community associated with the musician (such as a fan club), or is a member of a premium user group. In one embodiment, a user may provide a financial premium, or another asset, in exchange for having their shared schedule weighted more heavily than other users. Thus, the embodiments may provide premium scheduling services for premium users. In some embodiments, the weights may be determined via machine learning and/or artificial intelligent agents or bots that analyze the user's behaviors and preferences, as well as a user profile.

Furthermore, the various embodiments include notification systems. Such notification systems provide an audible, visual, and/or text-based notification or alert to a user when a calendar event is automatically added to a calendar via a synchronization event. For example, when a work-related event for a parent is added to the family calendar via the synchronization of the parent's work calendar with the family calendar, each family member may be provided a notification indicating the update to the family calendar. Another notification may be provided to a user when a calendar is automatically updated in view of an edit and/or update to an event initially included in another synchronized calendar. Furthering the above example, when the date of the parent's work event is updated to the following week, the family calendar may be automatically updated in view of the update to the parent's work calendar. Each family member may receive an additional alert that the family calendar has been updated in response to the update of the parent's work calendar Conventional calendar applications may enable a user to simultaneously view multiple calendars. However, such conventional calendars do not typically enable one calendar to automatically influence the events included in and/or viewable in another calendar. Some conventional calendars may enable the importation of calendar events. However, conventional methods of importing events into a calendar do not typically safeguard portions of the imported event data. That is, when an event is imported into a calendar, the entirety of the event data is often imported. Accordingly, in contrast to the various embodiments herein, such conventional methods do not enable the safeguarding of portions of event data.

Additionally, as discussed throughout, such embodiments enable more efficient use of computational and storage/memory resources of the computing systems employed in calendar applications. In a conventional calendar application, each calendar may include copies of each calendar event. Accordingly, in conventional calendars, when one event from one calendar is imported into another calendar, another copy of the event must be stored. Thus, in conventional systems, multiple copies of an event may need to be generated, stored, managed, and updated across multiple calendars. Multiple copies of events increases the computational and storage resources required to manage multiple calendars.

In contrast to such conventional means, in the various embodiments, when an event is added to a calendar via a synchronization of multiple calendars, only a single copy of the event is required. Each calendar may only access selective portions of the event, based on a synchronization profile for the calendars involved. Thus, the various embodiments employ efficient data structures for calendars and events that may tend to decrease the number of copies of events and calendars that must be managed. Accordingly, the various embodiments enable a computational system to more efficiently manage and synchronize multiple calendars and multiple calendar events. That is, less computational and storage resources, as compared to conventional systems, are required for the various embodiments.

Furthermore, in such conventional systems, the multiple copies of an event may not be synchronized when one copy of the event is updated. For example, in contrast to the enhanced embodiments discussed here, if one copy of an event included in a first calendar is updated, another copy of the event included in another calendar may not be automatically updated. By use of the efficient data structures discussed herein, updating an event ensures the automatic synchronization of the update in all relevant calendars occurs, while simultaneously enforcing the safeguarding of individual items of event data from certain calendars based on the automatically and/or manually customized synchronization profiles.

Turning now to FIG. 1A, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; server 106; sensors 103*a* and 107; and network 110. It should be understood that environment 100 shown in FIG. 1A is an example of one suitable operating environment. Each of the components shown in FIG. 1A may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104*a* and 104*b* through 104*n* may comprise data sources and/or data systems, which are configured to make data available to any of the various constituents of operating environment 100; data structures 120, 140, and 160 described in connection to FIG. 1B; or system 200 described in connection to FIG. 2. (For instance, in one embodiment, one or more data sources 104*a* through 104*n* provide (or make available for accessing) user data to user-data collection component 210 of FIG. 2.) Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* through 104*n* comprise one or more sensors 103*a*, 107, which may be integrated into or associated with one or more of the user device(s) 102*a*, 102*b*, or 102*n* or server 106. Examples of sensed user data made available by data sources 104*a* through 104*n* are described further in connection to user-data collection component 210 of FIG. 2.

Figure 2:
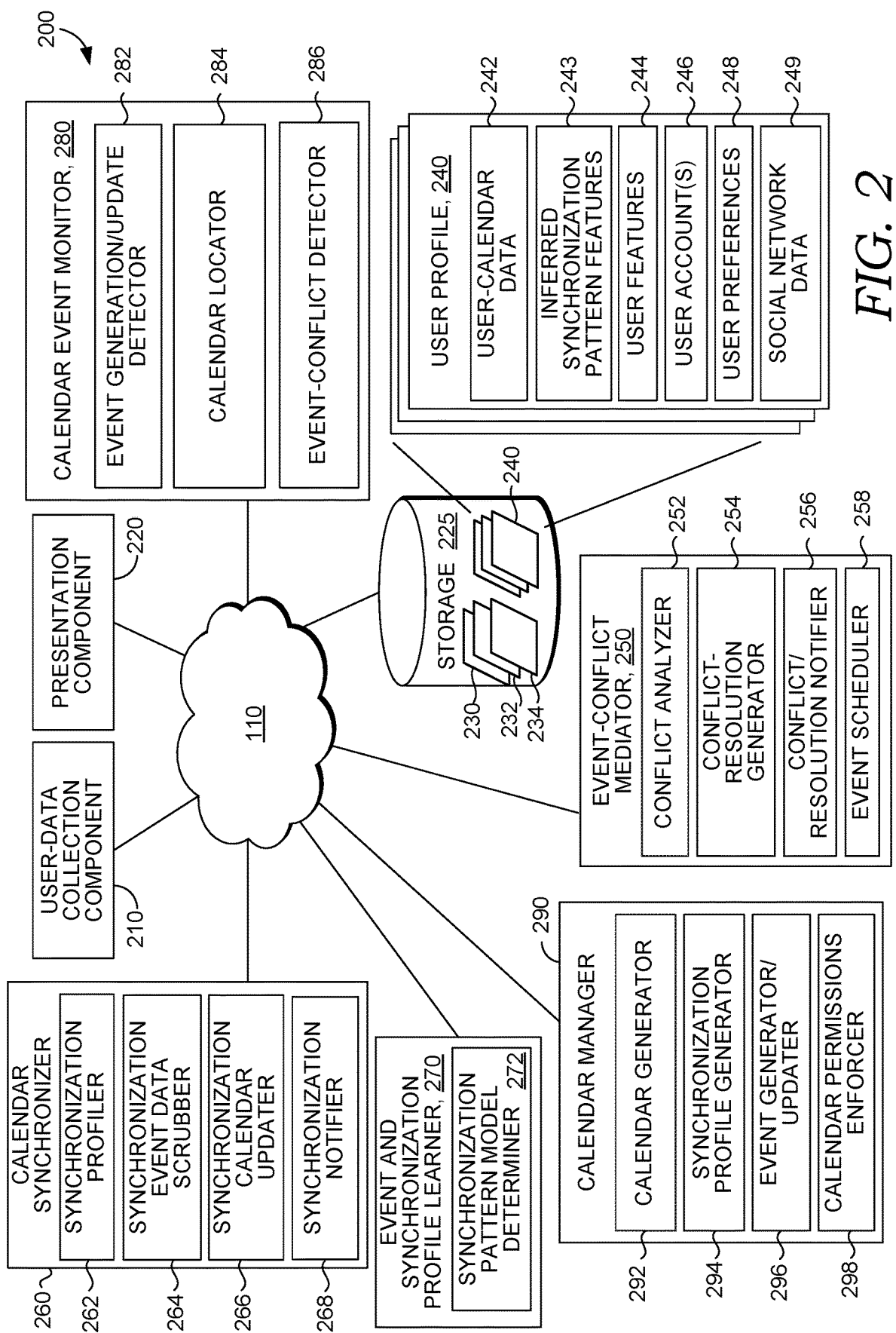
FIG. 2 is a block diagram illustrating an exemplary calendar synchronization system in which some embodiments of the present disclosure may be employed.

Operating environment 100 can be utilized to implement one or more of the components of calendar item enrichment system 200, described in FIG. 2, including components for collecting calendar event data, generating calendar event behavior pattern models, generating user location patterns, generating user profile details, and/or generating and/or presenting enriched calendar event information to consumers or users. Operating environment 100 also can be utilized for implementing aspects of process flows 400, 500, 520, 540, and 560 described in conjunction with FIGS. 4-5D.

Figure 1B:
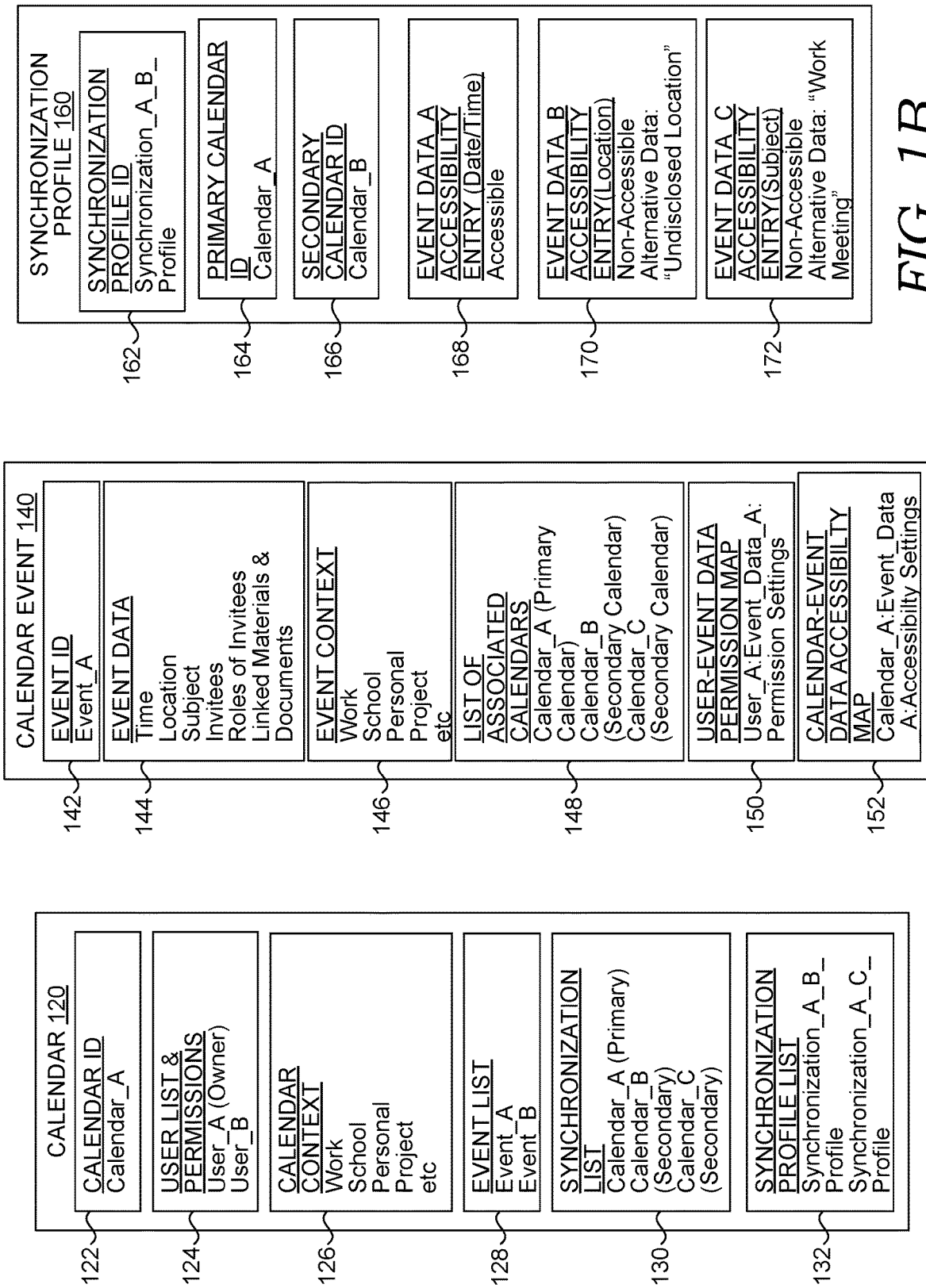
FIG. 1B is a block diagram of exemplary structured data suitable for use in implementing embodiments of the present disclosure.

FIG. 1B is a block diagram of exemplary, but non-limiting, structured data suitable for use in implementing embodiments of the present disclosure. For instance, the various embodiments of calendars discussed herein may be encoded in data, such as but not limited to data structured at least similar to calendar 120. Any component of system 200 may generate, update, and access calendar 120. For instance, calendar generator 292 of calendar manager 290 of FIG. 2 may generate a calendar; event generator/updater 296 or synchronization calendar updater 266 may update calendar 120 by adding/deleting associated events to calendar 120; or event-conflict mediator 250 may access calendar 120 to resolve multiple-event and multiple-user conflicts, as discussed here.

Calendar 120 includes a calendar identification (ID) 122. Calendar ID 122 includes a unique name, address, pointer, link, or another value that uniquely identifies and/or locates calendar 120. Accordingly, calendar ID 122 may differentiate calendar 120 from other calendars included in calendar synchronization system 200 of FIG. 2. Any component of system 200 may employ calendar ID 122 to locate calendar 120. For instance, calendar locator 284, or another component of calendar event monitor 280 of system 200, may locate a calendar via calendar ID 122. An exemplary calendar ID is shown in FIG. 1B as Calendar_A.

Calendar 120 includes a user list and associated permissions 124. User list and permissions 124 may include an indication or user ID of each user associated with calendar 120. For example, user IDs User_A and User_B maybe may be associated with calendar 120. Any user associated with calendar 120 may be enabled to at least view calendar 120. One of the associated users, such as User_A, may be an owner of calendar 120. One or more permissions may be associated with each user associated with calendar 120. User permissions indicate, for each user, the user's permissions pertaining to viewing, adding, deleting, and/or editing events included in calendar 120. In various embodiments, a user associated with a calendar may be enabled to view at least a portion of the event data of at least a portion of the events included in the calendar. Calendars with only a single associated user may be referred to as an individual calendar, while calendars with more than one associated user, such as calendar 120, may be referred to as a shared calendar. Any component of system 200 may enforce user permissions, such as but not limited to calendar permissions enforcer 298, or another component of calendar manager 290.

Calendar 120 may include a calendar context 126. In various embodiments, calendar context 126 may be and/or include calendar semantics. For instance, calendar 120 may be a work calendar, a school calendar, a personal calendar, or a project calendar. Other calendar contexts are possible. Any component of system 200 may be employed to determine the context of a calendar. For instance, calendar manager 290 may determine the context of a calendar. One or more events may be associated with and/or included in calendar 120. As such, calendar 120 may include an event list 128. Event list 128 may include an indication, such as an event ID, for each event associated with calendar 120. For instance, Event_A and Event_B are associated with calendar 120. When an event is associated with a calendar, the calendar may display at least a portion of the event data for the event to each of the users associated with calendar 120. Calendar event 140 provides one non-limiting exemplary embodiment of structured data encoding an event included in event list 128. As discussed below, each event may include a context. In one embodiment, a calendar event monitor, such as calendar event monitor 290 of FIG. 2, may determine the context of events associated with a calendar. The context of the calendar may be determined based the context of the events associated with the calendar.

Calendar 120 includes a synchronization list 130. Synchronization list 130 includes one or more indications, such as a calendar ID, for each calendar that is to be synchronized in response to updates and/or edits to calendar 120, e.g., Calendar_B and Calendar_C. In at least the embodiment shown in FIG. 1B, synchronization list 130 also includes the calendar ID for the calendar, i.e., Calendar_A. In the embodiment shown in FIG. 1B, Calendar_A may be referred to as the primary calendar, while the other calendars that are to be synchronized in response to updates and/or additions to the primary calendar may be referred to as secondary calendars.

Calendar 120 includes a synchronization profile list 132. Synchronization profile list 132 includes a synchronization profile ID that uniquely identifies a synchronization profile for calendar 120 (i.e., primary Calendar_A) and each secondary calendar listed in synchronization list 130. In FIG. 1B, synchronization profile list 132 includes the synchronize profile IDs Synchronization_A_B_Profile and Synchronization_A_C_Profile. A synchronization profile provides a list of rules, heuristics, or policies regarding the synchronization of the secondary calendar, in response to updates to the primary calendar. In some embodiments, every calendar may update and/or influence any other calendar. For instance, a synchronization profile may indicate which items of event data to provide (or make accessible) to a secondary calendar and which items of event data to secure from, or otherwise make non-accessible to, the secondary calendar when synchronizing the calendar. More specifically, for events that list Calendar_A as the primary calendar and Calendar_B as a secondary calendar, Synchronization_A_B_Profile may be employed to synchronize the event from Calendar_A to Calendar_B. Likewise, for events that list Calendar_A as the primary calendar and Calendar_C as a secondary calendar, Synchronization_A_C_Profile may be employed to synchronize the event from Calendar_A to Calendar_C.

Note that Calendar_C may include a calendar synchronization profile for Calendar_A (Synchronization_C_A_Profile) that would be employed to synchronize events from Calendar_C to Calendar_A, i.e., events that list Calendar_C as the primary calendar and Calendar_A as a secondary calendar. Such synchronization need not be symmetrical. That is, Calendar_A's synchronization profile for Calendar_C may be, but is not required to be, different than Calendar_C's synchronization profile for Calendar_A. More specifically, Synchronization_A_C_Profile and Synchronization_C_A_Profile need not be symmetric synchronization profiles. A non-limiting exemplary embodiment of structured data for encoding a synchronization profile is shown as synchronization profile 160.

Various components of system 200 may generate and/or update a synchronization profile. For instance, components of calendar manager 290, such as but not limited to synchronization profile generator 294, may be employed to generate and/or update a synchronization profile. In some embodiments, machine learning and/or artificial intelligence agents may be employed to generate and/or determine a synchronization profile. Such machine learning and/or artificial intelligence may be employed by a synchronization profile learner, such as event and synchronization profile learner 270 of FIG. 2.

Calendar event 140 is a non-limiting example of structured data encoding a calendar event. Any component of system 200 of FIG. 2 may generate, update, and access at least portions of calendar event 140. For instance, event generator/updater 296 of calendar manager 290 may generate and/or update events. As discussed throughout, an event generation/update detector included in calendar event monitor 290 or a calendar, such as calendar 120, may access at least portions of calendar event 140.

Calendar event 140 includes an event ID 142, such as Event_A, which uniquely identifies and differentiates event 140 from other events. Event ID 142 may include a name, an address, a pointer, a link, or another value uniquely identifying the event. Event ID 142 may be used by any component of system 200 of FIG. 2 to locate event 140. Calendar event 140 includes multiple items of event data 144. Items of event data 144 may include but are not limited to (padded and non-padded) start time, (padded and non-padded) stop time, (padded and non-padded) duration, location (virtual or real), subject, topics to be discussed, list of invitees, roles of each invitee, links to materials or relevant documents, and the like. Virtually any information or data related to and/or associated with the event may be included as an item of event data in event data 144. Particular portions of event data may be referred to as an item of event data or event data items. Calendar event 140 may include an event context 146, such as but not limited to a work event, school event, personal event, project-oriented event, or the like.

Calendar event 140 includes a list of associated calendars 148 that includes an indication, such as a calendar ID, of each associated calendar. When a calendar, such as Calendar_A, Calendar_B, or Calendar_C, is associated with calendar event 140, at least a portion of items of event data 144 are accessible to each associated calendar. In response to the generation and/or updating of event 140, each of the associated calendars are synchronized, such that if the item of event data is accessible to the calendar, the values of the updated items of event data is made accessible to each associated calendar. In some embodiments, the calendar in which the event was initially generated is defaulted to the primary calendar for the event, while the other associated calendars are referred to as secondary calendars for the event. The secondary calendars may be determined based on the synchronization list, such as synchronization list 130, of the primary calendar. That is, an event may automatically be associated with each of the calendars to be synchronized with the event's primary calendar. In various embodiments, the user may edit which calendar is the primary calendar for the event, such that the primary calendar need not be the calendar in which the event was initially added.

Calendar event 140 includes user-event data permission map 150. User-event data permission map 150 provides a map or a 2D (or higher dimension) table that provides read, write, and/or edit permissions for each user associated with each associated calendar and for each event data item included in event data 144. For example, for User_A (associated with Calendar_A) and Event_Data_A item (included in event data 144), user-event permission map 150 includes associated read, write, and/or edit permissions. The user-event permission map 150 may be enforced by a calendar permissions enforcer, such as but not limited to calendar permissions enforcer 298 of calendar manager 290.

Calendar event 140 includes a calendar-event data accessibility map 152. Calendar-event data accessibility map 152 includes a map or a 2D (or higher dimension) table that provides one or more accessibility or visibility settings for each item of event data included in event data 144 and for each calendar included in list of associated calendars 148. An accessibility setting may include a tag such as "accessible" or "non-accessible" indicating whether to make the item of event data accessible to the corresponding calendar. Each accessibility setting entry for a particular calendar and for each corresponding item of event data may be determined based on a synchronization profile for the calendar.

Components of system 200 may generate, update, access, and/or enforce the accessibility and non-accessibility of event data in various calendars. For instance, a calendar synchronizer, such as calendar synchronizer 260 may consult the calendar-event data map 152 to enforce the accessibility of various items of event data to various calendars. The calendar-event data map 152 may be generated and/or updated, via synchronization profiles, as discussed herein, by a calendar event monitor 280, a calendar manager 290, or some other component of system 200.

In some embodiments, each item of event data 144 is accessible to the event's primary calendar. For each associated secondary calendar, the synchronization profile for the secondary calendar that is included in the event's primary calendar may be consulted to determine the accessibility/non-accessibility for each item of event data. For instance, to synchronize calendar event 140 with Calendar_B, Synchronization_A_B_Profile of calendar 120 may be consulted. Likewise, to synchronize calendar event 140 with Calendar_C, Synchronization_A_C_Profile of calendar 120 may be consulted. In one embodiment, each item of event data need not be accessible to the event's primary calendar. For instance, a calendar may include a synchronization profile for itself. That is, synchronization profile list 132 of Calendar_A may include a Synchronization_A_A_Profile, that indicates at least a portion of the event data is non-accessible to or restricted from Calendar_A.

Synchronization profile 160 is a non-limiting example of structured data encoding a synchronization profile for a primary and a secondary calendar, such as those included in synchronization profiles of calendar 120. For instance, synchronization profile 160 may be Synchronization_A_B_Profile of synchronization profile list 132. In various embodiments, a synchronization profile may be dynamically "learned" based on monitoring the user's behavior, the context and/or semantics of one or more calendar events, the context and/or semantics of one or more calendars, event data, such as a list of attendees, the user's availability at the time, or other event data, such as sensitivity, unique time, or the like. As discussed in conjunction with at least event and synchronization profile learner 270 and synchronization pattern model determiner 272, a synchronization profile may be dynamic and generated and/or updated via various machine-learning methodologies, including but not limited to deep learning methods. Synchronization profile 160 includes a synchronization profile ID 162, such as Synchronization_A_B_Profile, which uniquely identifies and differentiates synchronization profile 160 from other synchronization profiles. Synchronization profile ID 162 may include a name, an address, a pointer, a link, or another value uniquely identifying the event. Synchronization profile ID 162 may be used by any component of system 200 of FIG. 2 to locate synchronization profile 160.

Synchronization profile 160 includes a primary calendar ID 164, such as Calendar_A, which uniquely identifies a primary calendar for synchronization profile 160. Synchronization profile 160 also includes a secondary calendar ID 166, such as Calendar_B, which uniquely identifies a secondary calendar for synchronization profile 160. When an event, such as calendar event 140, is added to the calendar indicated by primary calendar ID 164, or when an event that indicates primary calendar ID 164 as its primary calendar is updated, the various embodiments consult synchronization profile 160 to determine how to synchronize the event with the calendar indicated in secondary calendar ID 166.

As such, for each item of event data that may be included in an event, synchronization profile 160 includes an accessibility entry, such as but not limited to accessibility entries 168, 170, and 172. Each accessibility entry corresponds to a specific item (or type) of event data and provides an accessibility setting for that item of event data for the calendar identified in secondary calendar ID 166. An accessibility setting indicates whether the item of event data is accessible, or non-accessible, to the calendar identified in secondary calendar ID 166, for events synchronized from the calendar identified in primary calendar ID 164 to the calendar identified in secondary calendar ID 166. When items of event data are not accessible to a calendar, an alternative item of data, such as but not limited to "work meeting," may be provided to the calendar.

For instance, accessibility entry 168 is for the date and time event data items for events that are synchronized from Calendar_A to Calendar_B. Accessibility entry 168 indicates that each of the time and date for events, which indicate Calendar_A as the primary calendar and Calendar_B as a secondary calendar, is accessible to Calendar_B. Thus, when an event is added to Calendar_B, in response to a synchronization with the event being generated in Calendar_A, Calendar_B (and thus users enabled to view Calendar_B) are provided access to the date and time event data items for the event.

Similarly, accessibility entry 170 is for the location event data item for events that are synchronized from Calendar_A to Calendar_B. Accessibility entry 170 indicates that the location for events that indicate Calendar_A as the primary calendar and calendar B as a secondary calendar, are not accessible to Calendar_B. Thus, when an event is added to Calendar_B, in response to a synchronization with the event being generated in Calendar_A, Calendar_B (and thus users enabled to view Calendar_B) are not provided access to the location event data item for the event. Thus, although users enabled to view Calendar_B are enabled to view the time and date for events for which the primary calendar is Calendar_A, when viewing Calendar_B, the location for such events is obscured to such users. Alternative data may be included in an accessibility entry. For instance, in Calendar_B, where the location of an event is normally displayed, the text "undisclosed location" will be displayed. The user may provide the entries for alternative data.

Accessibility entry 172 is for the subject event data item for events that are synchronized from Calendar_A to Calendar_B. Accessibility entry 172 indicates that the meeting subject for events included in or associated with primary Calendar_A are not accessible to Calendar_B. Rather, Calendar_B will display "work meeting" for events synchronized from Calendar_A. It should be noted that calendars, calendar events, and synchronization profiles, as discussed herein, may be encoded in other data structures than those discussed in conjunction with FIG. 1B. In one embodiment, a calendar, a calendar event, or a synchronization profile may be encoded in unstructured data. Any component of system 200 of FIG. 2 may employ one or more calendars, calendars events, or synchronization profiles discussed in conjunction with FIG. 1B.

Referring now to FIG. 2, in conjunction with FIGS. 1A-1B, a block diagram is provided showing aspects of an example computing system architecture suitable for implementing an embodiment of the disclosure and designated generally as multi-calendar synchronization system 200. When referring to calendars, calendar events, synchronization profiles in the following discussion, the calendars, calendar events, and synchronization profiles may be similar to calendar 120, calendar event 140, and synchronization profile 160 of FIG. 1B. The calendar synchronization system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

The calendar synchronization system 200 includes network 110, which is described in connection to FIG. 1A, and which communicatively couples components of calendar synchronization system 200, including but not limited to user-data collection component 210, presentation component 220, user profile 240 (through storage 225), event-conflict mediator 250, calendar synchronizer 260, calendar event monitor 280, and calendar manager 290. Storage 225 may store one or more calendars, calendar events, and/or synchronization profiles, such as but not limited to the embodiments discussed in conjunction with FIG. 1B.

Calendar manager 290 is generally responsible for managing the calendars of system 200. For instance, calendar manager 290 may be responsible for generating/updating calendars, synchronization profiles, and calendar events. Calendar manager 290 may further enforce calendar permissions, such as but not limited to user read and write permissions for both calendars and calendar events. Calendar event monitor 280 is generally responsible for monitoring calendar activity. In various embodiments, calendar event monitor 280 may detect the generation and/or update of calendar events, carried out generally by calendar manager 290. In response to detecting the generation and/or update of a calendar event, calendar event monitor 280 may locate calendars to synchronize based on the detected event via the synchronization profiles generated by calendar manager 290. Calendar event monitor 280 may further detect temporal and/or spatial conflicts between multiple events associated with a user.

Calendar synchronizer 260 is generally responsible for synchronizing the calendars located by calendar event monitor 280. That is, calendar synchronizer 260 is generally responsible for adding synchronized events to calendars and enforcing the accessibility of the various items of event data. For instance, calendar synchronizer 260 may locate the relevant synchronization profiles and determine which event data for a shared event to make accessible to which calendars and which event data to restrict from which calendars. Calendar synchronizer 260 may then make accessible the determined portion of the event data with the determined calendars, while restricting other event data from the calendars via one or more synchronization events. Calendar synchronizer 260 may provide one or more notifications to users of the synchronized calendars.

Event-conflict mediator 250 is generally responsible for mediating the temporal and/or spatial conflicts detected by calendar event monitor 280, as well as scheduling events for multiple users. For example, event-conflict mediator 250 may analyze and resolve a conflict between two or more events that a user is interested in attending. Resolving a conflict may include providing recommended alternative dates, times, or locations for at least one of the events in conflict. In addition to resolving conflicts, event-conflict mediator 250 may act as an event scheduler as discussed herein. Event-conflict mediator 250 may provide notifications to users pertaining to the scheduled events and resolved conflicts. That is, event-conflict mediation 250 generally mediates and resolves multiple-event conflicts and multiple-user conflicts as discussed throughout. In additional to conflict identification and resolution, event-conflict mediator 250 may also enable and/or perform event "conflation" analysis and resolution as discussed throughout.

As described herein, user features in user profile 240 are generated based on different user signals, such as location history, user accounts, etc. Additionally, signals from event-conflict mediator 250, calendar synchronizer 260, calendar event monitor 280, calendar manager 290, and additional user signals may be combined together to generate combined insights or features. As an example, user historical user behavior or preference patterns may be considered in combination with synchronization events to at least partially automate the customization of one or more synchronization profiles. The components of calendar synchronization system 200 may be embodied as a set of compiled computer instructions or functions, program modules, computer software services, or an arrangement of processes carried out on one or more computer systems.

It should be understood that the calendar synchronization system 200 shown in FIG. 2 is an example of one system in which embodiments of the present disclosure may be employed. Each component shown may include one or more computing devices similar to the computing device 600 described with reference to FIG. 6. The calendar synchronization system 200 should not be interpreted as having any dependency or requirement related to any single module/component or combination of modules/components illustrated therein. Each may comprise a single device or multiple devices cooperating in a distributed environment. For instance, the calendar synchronization system 200 may comprise multiple devices arranged in a distributed environment that collectively provide the functionality described herein. Additionally, other components not shown may also be included within the network environment. It should be understood that the calendar synchronization system 200 and/or its various components may be located anywhere in accordance with various embodiments.

The calendar synchronization system 200 generally operates to synchronize multiple calendars based on one or more synchronization profiles for the calendars. That is, in response to the addition of an event to a first calendar, system 200 may automatically add the event to a second calendar based on a synchronization profile, wherein the event indicates that the first calendar is a primary calendar for the event and the second calendar is a secondary calendar for the event. Furthermore, when the event is added to a secondary calendar, at least portions of the information (i.e., items of event data) included in the event are not accessible to the secondary calendar. The synchronization profile indicates which items of event data associated with the event to make accessible to the second calendar, and which items of the event data to make non-accessible to the second calendar. In this way, a user that adds an event to a first calendar may enable users of the second calendar visibility into selective portions of information of events in the first calendar, while safeguarding other information of the events that the user may wish to keep secure. As discussed throughout, system 200 may also detect and resolve temporal and spatial multiple-event conflicts, as well as perform event scheduling services as discussed throughout, i.e., multiple-user conflicts.

User-data collection component 210 is generally responsible for accessing or receiving (and in some cases also identifying) user data from one or more data sources, such as data sources 104a and 104b through 104n of FIG. 1A. In some embodiments, user-data collection component 210 may be employed to facilitate the accumulation of data associated with the calendars, calendar events, and synchronization profiles for all calendars and all users of the calendar synchronization system 200 (including crowd-sourced data). The data may be received (or accessed), and optionally accumulated, reformatted and/or combined, by user-data collection component 210 and stored in one or more data stores such as storage 225, where it may be available to other components of the calendar synchronization system 200. Further, the user-data collection component 210 may be configured to associate each of the calendar-related data elements with one or more user profiles and to store the associated calendar event data elements in a corresponding user profile 240.

Example system 200 also includes storage 225. Storage 225 generally stores information including data, computer instructions (e.g., software program instructions, routines, or services), and/or models used in embodiments of the technologies described herein. In an embodiment, storage 225 comprises a data store 234 (or computer data memory). Data store 234 may store one or more calendars, one or more calendar events, and one or more synchronization profiles, such as but not limited to calendar 120, calendar event 140, and synchronization profile 160 discussed in conjunction with FIG. 1B. Storage 225 may also include pattern inference logic 230, as well as conflict and scheduling logic 232, as discussed herein. Briefly, pattern inference logic 230 may include machine learning, statistical, and/or artificial intelligence logic that is enabled to detect, infer, or otherwise recognize patterns and or features within data. For instance, pattern inference logic 230 may infer explicit, latent, or hidden synchronization features or patterns within user and/or calendar data. Conflict and scheduling logic 232 may be enabled to detect and resolve spatial and/or temporal multi-event and multi-user conflicts based on comparisons between multiple calendars. That is, conflict and scheduling logic 232 is enabled to act as an event scheduler. Further, although depicted as a single data store component, storage 225 may be embodied as one or more data stores or may be in the cloud.

Calendar data and user data may be received from a variety of sources where the data may be available in a variety of formats. As used herein, calendar data may refer to any data related to and/or encoding any information related to calendars, calendar events, synchronization profiles, and the like. Calendar data may refer to any data and/or information discussed in conjunction with at least calendar 120, calendar event 140, or synchronization profile 160 of FIG. 1B. For example, in some embodiments, calendar data and user data received via user-data collection component 210 may be determined via one or more sensors (such as sensors 103a and 107 of FIG. 1A), which may be on or associated with one or more user devices (such as user device 102a), servers (such as server 106), and/or other computing devices. As used herein, a sensor may include a function, routine, component, or combination thereof for sensing, detecting, or otherwise obtaining information such as calendar data and user data from a data source 104a, and may be embodied as hardware, software, or both. By way of example and not limitation, calendar data and user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with events; etc.) including user activity that occurs over more than one user device, user history, session logs, application data, contacts data, calendar and schedule data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein. In some respects, calendar event data may be provided in user signals. A user signal can be a feed of calendar event data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

Calendar event monitor 280 is generally responsible for extracting calendar data from the data gathered by user data collection component 210. Calendar event monitor 280 receives the calendar data, including both historic and future items of calendar event data for calendar events, such as but not limited to items of event data 144 of calendar event 140. The received calendar event data may be used to determine calendar event information, which may include a variety of features associated with the meeting or calendar event (sometimes referred to herein as items of calendar event data or calendar event information) or other information regarding specific calendar event items and related contextual information. Embodiments of calendar event monitor 280 may determine, from the monitored calendar data, calendar event data items associated with a particular user. As described herein, the calendar event information determined by calendar event monitor 280 may include calendar events information from multiple user devices associated with the user and/or from cloud-based services associated with the user (such as email, calendars, social-media, or similar information sources), and which may include contextual information associated with the identified calendar event, such as but not limited to event context 146 of calendar event 140. Calendar event monitor 280 may determine current or future calendar event information and may also determine historical calendar event information, in some embodiments, which may be determined based on gathering observations of calendar events over time, and accessing calendar logs of past activity. Further, in some embodiments, calendar event monitor 280 may determine calendar events (which may include historical activity) from other similar users' calendars (i.e., crowdsourcing), as described herein. This information may include features associated with an organization or group to which the user belongs, or may include features which are global in nature.

In some embodiments, information determined by calendar event monitor 280 may be provided to storage 225 and stored in a user profile 240 as user-calendar data 242. User-calendar data 242 may include any calendar data related to the calendars, calendar events, and synchronization profiles associated with the user. As described previously, user-calendar data 242 may be determined by monitoring user data received from user-data collection component 210. In an embodiment, calendar event monitor 280 comprises one or more applications or services that analyze information detected via one or more user devices used by the user and/or cloud-based services associated with the user, to determine calendar event information and related contextual information. Information about calendar data associated with a user (i.e., user-calendar data 242) may be determined from the user data made available via user-data collection component 210, and may be provided to calendar event monitor 280, or other components of system 200.

More specifically, in some implementations of calendar event monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of calendar event monitor 280, or its subcomponents, may determine a device name or identification (device ID) for each device associated with a user. This information about the identified user devices associated with a user may be stored in a user profile associated with the user, such as user profile 240. In an embodiment, the user devices may be polled, interrogated, or otherwise analyzed to determine information about the devices. This information may be used for determining a label or identification of the device (e.g. a device ID) so that the user interaction with the device may be recognized from user data by calendar event monitor 280. In some embodiments, users may declare or register a device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

As shown in example system 200, calendar event monitor 280 includes an event generation/update detector 282, calendar locator 284, and an event-conflict detector 286. In some embodiments, calendar event monitor 280, one or more of its subcomponents, or other components of system 200, such as calendar synchronizer 260, event-conflict mediator 250, or calendar manager 290, may determine interpretive data from received user data. Interpretive data corresponds to data utilized by these components of system 200 or subcomponents of calendar event monitor 280 to interpret user data. For example, interpretive data can be used to provide other context to user data, which can support determinations or inferences made by the components or subcomponents. Moreover, it is contemplated that embodiments of calendar event monitor 280, its subcomponents, and other components of system 200 may use user data and/or calendar data (including calendar event information, event data, and synchronization data) in combination with interpretive data for carrying out the objectives of the subcomponents described herein. Additionally, although several examples of how calendar event monitor 280 and its subcomponents may identify calendar event information are described herein, many variations are possible in various embodiments of the disclosure.

Event generation/update detector 282, in general, is responsible for detecting (or at least identifying) the generation and/or updates of calendar events, such as but not limited to calendar event 140 of FIG. 1B. Embodiments of event generation/update detector 282 may be used for determining the generation or updating of current or future calendar events or one or more historical calendar events. Some embodiments of event generation/update detector 282 may monitor user data for calendar event related features or updates to items of event data corresponding to the events, such as duration, time, title, location information, recurring event (or not), attendee list, the email domain of attendees, or similar information.

Detecting the generation or updates to calendar events may include extracting contextual information from the event. As such, in some embodiments, event generation/update detector 282 may determine and extract information about calendar events, such as contextual information. Examples of extracted calendar event information may include keywords, invitees, emails or social media posts related to the event, user browsing activity or online activity associated with the event, or nearly any other data related to calendar events associated directly or indirectly with the user. Event generation/update detector 282 may also associate the determined contextual information with the detected calendar event. For example, some embodiments of event generation/update detector 282 provide the determined contextual information to be stored as structured data within the event, such as but not limited to event context 146 of event 140. As discussed further below, event generation/update detector 282 may also determine features of the calendar event and/or related contextual information. Contextual information may also be used for pattern identification, with or without additional signals. Additionally, context may extend beyond any specific meeting. For example, the meeting before or after a particular meeting may provide context. Continuing with the example, the before meeting may have a title (such as "important review), and it may be known that the user tends to be at work at least two hours prior to a past meeting with this title.

Some embodiments of event generation/update detector 282 determine contextual information related to a group or organization of which the user is a part, such as entities identified in a calendar event or related to the calendar event (e.g., keywords common to an organization, group characteristics, recipients of a group email sent by the user having a common domain name, attachments, links or other content that is known to be associated with an organization, and/or specific conference room names). Additionally, event generation/update detector 282 may also identify contextual features that are more global in nature (e.g., terms like OOO or OOF to indicate out of office). Other contextual information, by way of example and not limitation, may include context features such as location data, which may be represented as a location stamp associated with the activity, and contextual information about the location, such as venue information (e.g., this is the user's office location, home location, school, restaurant, movie theater).

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described herein, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described herein, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some implementations, event generation/update detector 282 may receive user data from user-data collection component 210, parse the data, in some instances, and identify and extract context features or variables. Items of context variables may be stored as a related set of contextual information associated with the calendar event, and may be stored in a user profile, such as in user-calendar data 242. In some embodiments, context variables and/or context information are stored as event context 146 of FIG. 1B. In some cases, contextual information may be used by one or more calendar event pattern consumers, such as for providing additional details to a user to enhance a user experience, such as calendar synchronization, conflict mediation, and event scheduling services.

In some embodiments, event generation/update detector 282 also determines calendar event-related features (or variables) from information about a calendar event and/or from related contextual information. That is, event generation/update detector 282 may determine and/or encode generated and/or updated items of event data, such as but not limited to event data 144 of FIG. 1B. Event generation/update detector 282 outputs and stores the determined set of calendar event features (items of event data), any organization or group features, as well as any global features. These items of event data may be stored in user profile 240 as user-calendar data 242.

Calendar locator 284 is generally responsible for locating each calendar to synchronize in response to detecting the generation and/or update of an event. For instance, in response to event generation/update detector 282 detecting the generation of an event, calendar locator 284 may consult a list of calendars included with the event, such as but not limited to the list of associated calendars 148 of event 140, to locate each calendar with which to synchronize or share the event. Calendar locator 284 may provide each located calendar to calendar synchronizer 260, such that the detected event may be shared and/or synchronized with the located calendars.

Event-conflict detector 286 is generally responsible for the detection of temporal and/or spatial multiple-event and/or multiple-user conflicts. For example, in response to the event generation/update detector 282 detecting the generation and/or update of an event of a first calendar, event-conflict detector 286 may check each calendar associated with the event for temporal and/or spatial conflicts with other events that involve one or more of the same users. That is, event-conflict detector 286 may consult with each calendar located by calendar locator 284 to check for temporal or spatial conflict that the generated and/or updated event may have with other events in the other calendars. Event-conflict detector 286 may employ conflict and scheduling logic 232 to detect spatial and/or temporal multiple-user and/or multiple-event conflicts. Event-conflict detector 286 may provide the detected conflicts to event-conflict mediator 250, which is enabled to analyze and resolve such conflicts.

Continuing with system 200 of FIG. 2, calendar manager 290 generally manages the generation and updates of calendars, calendar events, and synchronization profiles. As such, calendar manager 290 may include a calendar generator 292, a synchronization profile generator 294, an event generator/updater 296, and a calendar permissions enforcer 298. Calendar generator 292 is generally responsible for generating one or more calendars managed by calendar manager 290. For instance, calendar generator 292 may enable a user to generate a calendar, such as but not limited to calendar 120 of FIG. 1B. Calendar generator 292 may enable the user to provide any of the data included in calendar 120, such as but not limited to calendar ID 122, user list and permissions 124, calendar context 126, and the like.

Event generator/updater 296 is generally responsible for the generation and updating of calendar events, such as but not limited to calendar event 140 of FIG. 1B. For instance, event generator/updater 296 may enable a user to generate and/or update an event, as well as to include it or delete it from one or more calendars managed by calendar manager 290. A user may provide and/or update any of the data associated with the event, such as any of the data included in calendar event 140. That is, the user may provide an event ID, one or more items of event data, event context, indicate associated calendars, user read/write permissions for the event, and the like. Calendar permissions enforcer 298 is generally responsible for enforcing the calendar and event read/write permissions, including those discussed in conjunction with user list and permissions 124 of calendar 120 and user-event data permission map 150 of event 140.

Synchronization profile generator 294 is generally responsible for generating and updating synchronization profiles, such as but not limited to synchronization profile 160 of FIG. 1B. A user may be enabled to manually generate and/or edit/update a synchronization profile via synchronization profile generator 294. In some embodiments, synchronization profile generator 294 may employ an event and synchronization profile learner 270 to at least partially automate the generation and updating of a synchronization profile. Event and synchronization profile learner 270 may include machine learning subcomponents and/or artificial intelligent agents to monitor the user's historical activity to generate the user's preferences for a synchronization profile. Event and synchronization profile learner 270 may employ any of the calendar data and user data discussed herein to "learn" a user's synchronization and scheduling preferences.

More specifically, event and synchronization profile learner 270 may include a synchronization pattern model determiner 272 that employs the user and calendar data to "learn" the user's synchronization and scheduling preferences. Synchronization pattern model determiner 272 is generally responsible for determining a user synchronization pattern model based on similarities identified in user information, calendar item event information, and the user's behavior relating to the synchronization of events across multiple calendars. In particular, synchronization pattern model determiner 272 may determine that certain features are predictive of user behavior with respect to the synchronization of calendars, while other features are less predictive. The predictive features are weighted higher in the resultant model and used by synchronization profile generator 294 to generate and/or update a synchronization profile.

Any of synchronization profile generator 294, events and synchronization profile learner 270, or synchronization pattern model determine 272 may employ pattern inference logic 230 to detect or infer various patterns or features. In some embodiments, the predictive features and resultant patterns and models may be determined using pattern inferences logic 230. Pattern inferences logic 230 may include rules, associations, conditions, prediction and/or classification models, or pattern inference algorithms. The pattern inferences logic 230 can take many different forms depending on the particular activity pattern or the mechanism used to identify a behavior pattern, or identify feature similarity among observed calendar item events to determine the pattern. For example, some embodiments of pattern inferences logic 230 may employ machine learning mechanisms to determine feature similarity, or other statistical measures to determine the calendar events belonging to a set of events and/or calendars that tend to be synchronized based on a determined pattern, as further described below. In some embodiments, the behavior pattern(s) determined by synchronization pattern model determiner 272 may be stored as inferred synchronization pattern features 243.

In some embodiments, synchronization pattern model determiner 272 provides a pattern of user's behavior relating to the synchronization of calendar events across multiple calendars and an associated confidence score regarding the strength of the synchronization pattern, which may reflect the likelihood that a user desires to follow the pattern for future synchronizations. More specifically, in some embodiments, a corresponding confidence weight or confidence score may be determined regarding a determined synchronization pattern for the calendar event. The confidence score may be based on the strength of the pattern, which may be determined based on the number of observations (of synchronizing a similar event or calendar) used to determine a pattern, how frequently the user's synchronization events are consistent with the pattern, the age or freshness of the synchronization observations, the number of similar features, types of features, and/or degree of similarity of the features in common with the synchronization events that make up the pattern, or similar measurements. In some embodiments, the features are weighted or conflated by synchronization pattern model determiner 272. Additionally, user-related features are generally given more weight than group or global features. Again, in some embodiments, the behavior pattern(s) determined by synchronization pattern model determiner 272 may be stored as inferred synchronization patterns 243.

Calendar synchronizer 260 is generally responsible for synchronizing events across multiple calendars, while safeguarding or restricting at least a portion of the event data from some of the calendars. That is, calendar synchronizer 260 is responsible for providing events to calendars, as well as enforcing the accessibility or non-accessibility of each item of event data for the provided events, based on a synchronization profile associated with the calendar that the event is provided to. Calendar synchronizer 260 may employ any of the data discussed in conjunction with FIG. 1B to carry out such functionality.

For instance, in response to calendar event monitor 280 detecting the generation of a new event or the update to an already existing event, calendar synchronizer 260 synchronizes one or more events across one or more calendars, such that at least portions of the event are shared or synchronized across the one or more calendars. Calendar synchronizer 260 may include a synchronization profiler 262, a synchronization event data scrubber 264, a synchronization calendar updater 266, and a synchronization notifier 268.

In response to the detection of the generation and/or update of a calendar event by event generation/update detector 282, synchronization profiler 262 may locate and/or access one or more synchronization profiles to synchronize the affected calendars. For instance, the synchronization profile may be stored in data store 234. More specifically, upon detection of the generation and/or update of an event, calendar locator 284 of the calendar event monitor 280 may locate and/or access one or more associated calendars stored in data store 234. Calendar locator 284 may consult the list of associated calendars 148 of FIG. 1B for the event to locate the associated calendars. Calendar locator 284 may determine which calendar is the primary calendar for the detected event and which calendars are secondary calendars. That is, calendar locator 284 may provide calendar synchronizer 260 a first calendar ID that corresponds to the event's primary calendar and one or more additional calendar IDs that correspond to the event's one or more secondary calendars. In some embodiments, calendar locator 284 provides the associated calendar IDs directly to the synchronization profiler 262.

Calendar synchronization profiler 262 may determine, locate, and/or access the relevant synchronization profiles by consulting the structured and/or unstructured data associated with the calendar. For instance, calendar synchronization profiler 262 may determine, locate, and/or access the synchronization profiles for each associated calendar via synchronization list 132 of calendar 120 of FIG. 1B and the received calendar IDs.

Synchronization event data scrubber 264 is generally responsible for parsing each of the accessed calendar synchronization profiles. More specifically, synchronization event data scrubber 264 determines and enforces the accessibility of items of event data for events that are provided to a calendar via the synchronization discussed herein. Based on parsing the synchronization profile for an event's primary calendar and a secondary calendar, synchronization event data scrubber 264 determines which items of event data to provide accessibility to a particular calendar of the one or more associated calendars. Synchronization event data scrubber 264 also determines which items of event data to restrict accessibility for a particular calendar of the one or more associated calendars. That is, synchronization event data scrubber 264 may consult each event data accessibility entry for each item of event data for each synchronization profile of the one or more calendars associated with the detected event.

Synchronization calendar updater 266 is generally responsible for providing the shared events to the one or more calendars. In providing shared events, synchronization calendar updater 266 may update each of the event's one or more associated calendars. That is, synchronization calendar updater 266 provides at least portions of each detected event to each of the event's associated calendars based on the determinations of the synchronization event data scrubber 264. Accordingly, synchronization calendar updater 266 may provide partially "scrubbed" events to a calendar. Synchronization notifier 268 is generally responsible for providing users one or more notifications or alerts to notify the user of synchronized or shared events. Such notifications or alerts may include an audible, visual, and/or text-based notification or alert to a user when a calendar event is automatically added to a calendar via a synchronization event.

Event-conflict mediator 250 is generally responsible for mediating and resolving spatial and/or temporal conflicts between two or more events, where at least one of the events is included in the one or more calendars. Resolving such conflicts may include providing recommendations for alternative dates, times, locations, and the like for the conflicting events. Event-conflict mediator 250 may additionally mediate and resolve spatial and/or temporal scheduling conflicts between multiple users. As such, event-conflict mediator 250 provides scheduling services for events that are relevant to a large number of users, wherein each user has a separate schedule as indicated in one or more calendars used by the user. To carry out such conflict resolution and event-scheduling services, event-conflict mediator 250 may include a conflict analyzer 252, a conflict-resolution generator 254, a conflict/resolution notifier 256, and an event scheduler 258. Any component of event-conflict mediator 250 may employ conflict and scheduling logic 232 to mediate and resolve conflicts, as well as to provide event scheduling services.

Conflict analyzer 252 is generally responsible for analyzing multiple-event and/or multiple-user conflicts, as discussed throughout. In analyzing such conflicts, conflict analyzer 252 may compare multiple calendars for multiple users to analyze the conflicting events, as well as the schedule for multiple users. Conflict analyzer 252 may also additionally determine and add the "padded" time to various events based on location information included in the events. Conflict analyzer 252 may additionally be responsible for determining user-weights associated with users that may have conflicting schedules and event-weights associated with conflicting events. The user- and event-weights may be determined in any fashion, including employing conflict and scheduling logic 232 to infer the weights via machine learning or artificial intelligence.

Conflict/resolution generation 254 is generally responsible for resolving conflicts. For instance, conflict/resolution generator 254 may determine alternative dates, times, and locations for events via the employment of conflict and scheduling logic 232. Conflict/resolution notifier 256 may provide users one or more audible, visual, and/or textual notifications or alerts to the conflict detection and resolution. Event scheduler 258 may provide the various event scheduling services discussed throughout.

Data stored in user profile 240 (to this point) will now be discussed and summarized. As discussed above, user-calendar data includes calendars, calendar events, and synchronization profiles. Inferred synchronization pattern features 243 include features of the user's pattern for previous calendar synchronizations, mostly determined from event and synchronization profiler learner 270. User features 244 generally include those features related to the user (as opposed to calendar, event, and synchronization features stored in components 242 and 243). User account(s) data 246 generally includes user data collected from user-data collection component 210 (which in some cases may include crowdsourced data that is relevant to the particular user) or other semantic knowledge about the user. In particular, user account(s) data 246 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Embodiments of user account(s) data 246 may store information across one or more databases, knowledge graphs, or data structures. User preferences 248 generally include user settings or preferences associated with the user or user calendar events. By way of example and not limitation, such settings may include user preferences about specific meetings (and related information) that the user desires be explicitly monitored or not monitored or categories of activities to be monitored or not monitored, crowdsourcing preferences, such as whether to use crowdsourced information, or whether the user's user-calendar data 242 and/or inferred synchronization pattern features 243 may be shared as crowdsourcing data. The social network data 249 may include data relating to the user's various social network connections and may be employed as a source of crowdsourced data to be employed by event synchronization profile learner 270 to determine synchronization patterns.

As noted above, pattern inference logic 230 contains the rules, conditions, associations, classification models, and other criteria to execute the functionality of event and synchronization profile learner 270. The presentation component 220 functions to render various interfaces and various other outputs generated by the calendar synchronization system 200 and the components thereof in a format that can be displayed on user devices. By way of example, the presentation component 220 may render a calendaring synchronization interface for receiving shared and/or synchronized calendar events and presenting additional information generated by system 200.

Figure 3A:
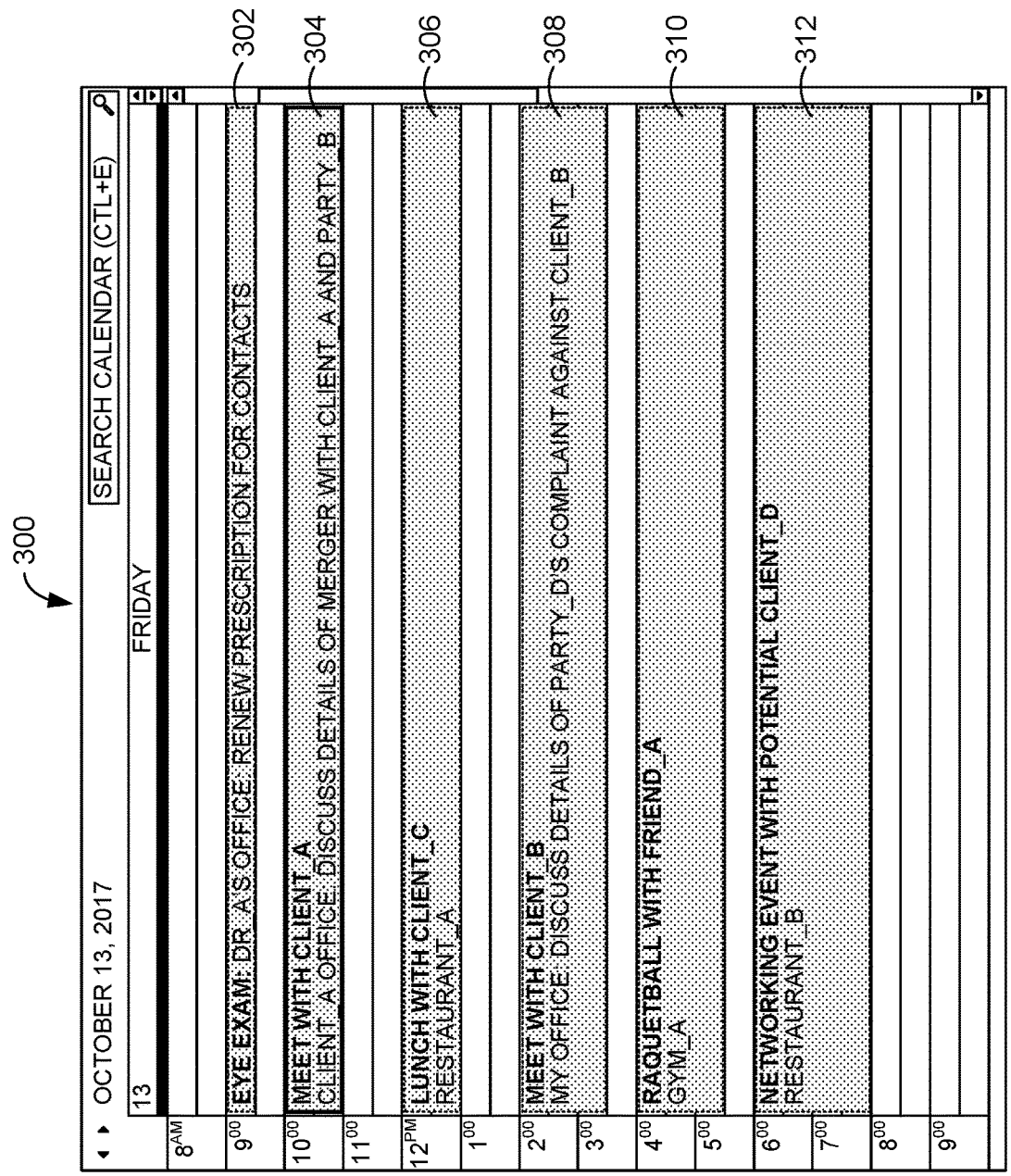
FIGS. 3A-3B show exemplary but non-limiting embodiments of two synchronized calendars.
Figure 3B:
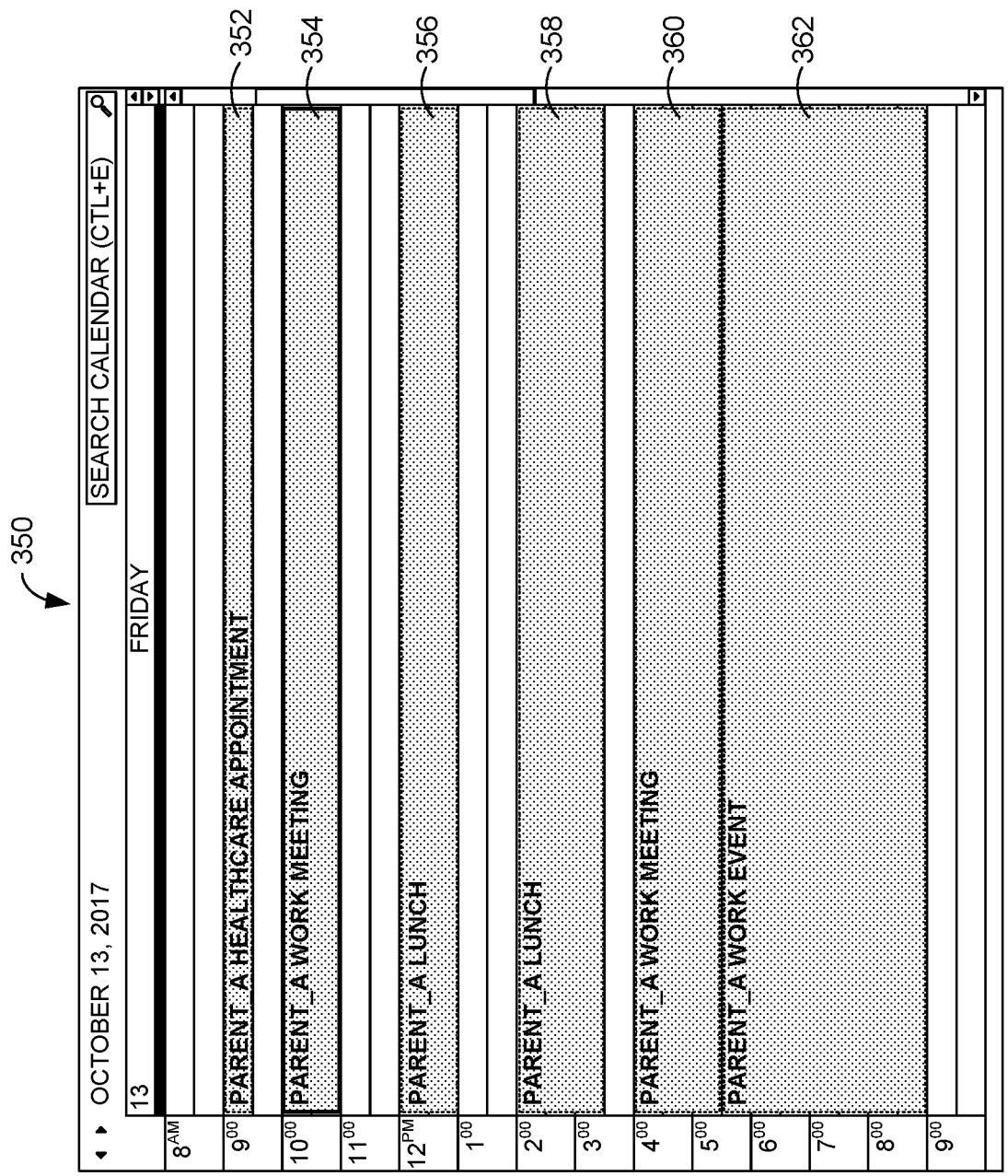

FIG. 3A shows an exemplary but non-limiting embodiment of a first calendar 300. FIG. 3B shows an exemplary but non-limiting embodiment of a second calendar 350. The first and second calendars 300/350 of FIGS. 3A-3B may be synchronized via the various embodiments discussed herein. In the non-limiting embodiments shown in FIGS. 3A-3B, first calendar 300 is a user's work-related calendar and the second calendar 350 is a family-related calendar for the user. First calendar 300 is an individual calendar in that the user is the only user with permissions to view the file. Second calendar 350 is a shared calendar in that any member of the user's family, including the user, is enabled to view the calendar. In this example, the user is a parent within the family, and may be referred to as Parent_A.

The first calendar 300 may be referred to as Parent_A's work calendar 300 and the second calendar 350 may be referred to as Parent_A's family calendar 350. Six events are shared with work calendar 300 and family calendar 350. For each of the six events, the work calendar 300 is the event's primary calendar and the family calendar 350 is a secondary calendar for the event. As shown in FIGS. 3A-3B, various items of the event data for each of the six events are accessible to each of the work calendar 300 and the family calendar 350. As shown in a comparison between FIG. 3A and FIG. 3B, the accessibility of at least a portion of the items of event data of the six shared events is restricted from to at least the family calendar 350.

The first calendar event is displayed as item 302 in work calendar 300 and displayed as item 352 in family calendar 350. The second calendar event is displayed as item 304 in work calendar 300 and displayed as item 354 in family calendar 350. The third calendar event is displayed as item 306 in work calendar 300 and displayed as item 356 in family calendar 350. The fourth calendar event is displayed as item 308 in work calendar 300 and displayed as item 358 in family calendar 350. The fifth calendar event is displayed as item 310 in work calendar 300 and displayed as item 360 in family calendar 350. The sixth calendar event is displayed as item 312 in work calendar 300 and displayed as item 362 in family calendar 350.

As noted above, some of the items of event data are accessible and displayed in each of the work and family calendars 300/350, while other items of event data are not accessed and/or displayed by the work calendar 350. For instance, the date (Oct. 13, 2017) and time event data items for each of the six events are shown in each calendar 300/350. However some of the items of the event data are not shown in the family calendar 350. In this way, Parent_A can provide each member of their family with information regarding his availability, while still safeguarding information that he may not wish to share. A calendar synchronizer, such as but not limited to calendar synchronizer 260 of system 200 of FIG. 2, may provide the events to each of the calendars 300/350, while enforcing the accessibility/non-accessibility of the various items of event data for each event, as discussed herein.

Event data for the first event, such as event title ("Eye Exam"), event location ("Dr_A's office"), and the purpose of the event ("Renew prescription for contacts") are accessible to the event's primary calendar (i.e., work calendar 300) but not accessible to the event's secondary calendar (i.e., family calendar 350). As discussed in conjunction with at least synchronization profile 160 of FIG. 1B, alternative data may be provided to a secondary calendar. For instance, the alternative data for the first event for the work calendar 350 displayed in item 352 includes "Parent_A Healthcare Appointment." Similar comparisons of item 304 of work calendar 300 and item 354 of family calendar 350 shows that some of the event data for the second event is restricted from family calendar 350.

Comparisons of the third, fourth, fifth, and sixth events displayed in the work and family calendars 300/350 show further restriction of event data and the replacement with alternative data for the various events. The sixth event, as displayed in item 362 of family calendar 350 includes "padded" time. That is, item 362 shows an extra half hour subtracted from the sixth event's start time and an extra half hour added to the sixth event's stop time, to accommodate Parent_A's travel time from Gym_A to Restaurant_B and Parent_A's travel time from Restaurant_B to the user's home. Such padded time may be determined and included in the event based on an analysis of the user's locations for the various events. Such padded time may be determined via an event-conflict mediator, such as but not limited to event-conflict mediator 250 of system 200. In some embodiments, conflict and scheduling logic 232 may be employed to determine an amount of padded time required based on the analysis of locations for events. By including the padded time in item 362, the calendar 350 provides Parent_A's availability to his family members based on travel times, without exposing the location of an event.

As shown in FIG. 3B, an influenced calendar is marked via representations of incorporated and/or synchronized events from another calendar. In various embodiments, rather than being populated via the synchronized event, the influenced calendar may be populated with a link, pointer, or some other reference to the synchronized event. The event may be opened, accessed, and/or viewed via a selection of the link or reference. In the various embodiments, when the link is selected, the user credentials may be employed to determine an authorization for viewing the event and/or event data. If the user's credentials enable the user to view the synchronized event's primary calendar, the event, as well as each of the event's event data, may be accessed. If the user's credentials do not enable the user to view the event's primary calendar, but only a secondary calendar for the event, only the accessible event data that is associated with the secondary calendar is provided to the user. In some embodiments, the user may be prompted for his credentials when selecting a link, pointer, or reference to a synchronized event.

Although not shown in FIGS. 3A-3B, if Parent_A attempts to add an event to calendar 300 that conflicts with an event already existing on calendar 350, the various embodiments of event-conflict mediation may detect and resolve the conflict. In such embodiments, Parent_A may be provided with a warning or notice of the detected conflict. Additionally, Parent_A may be provided with suggestions to resolve the conflict, i.e., alternative dates, times, and/or venues for the event they were attempting to add to calendar 300.

Figure 4:
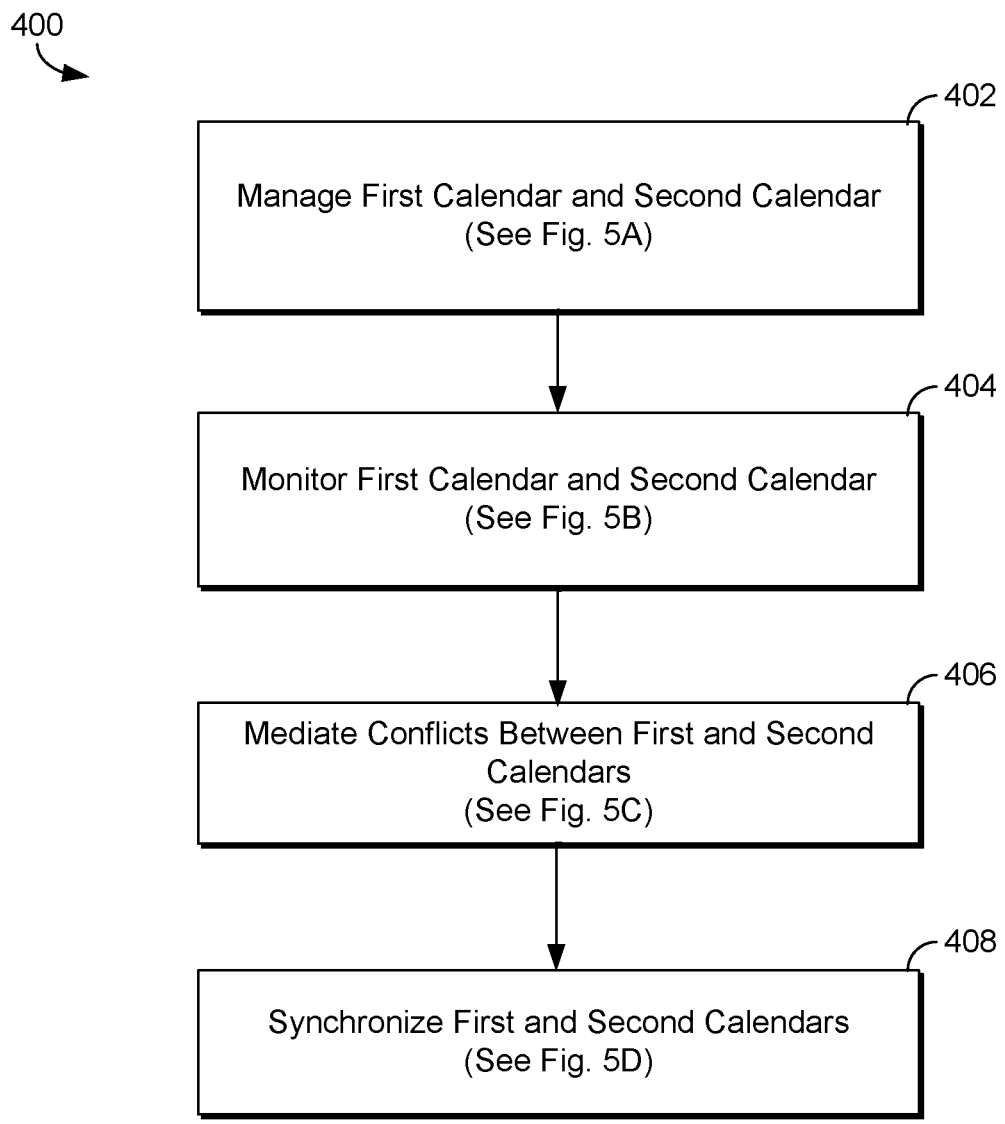
FIGS. 4-5D show flow diagrams of methods for synchronizing calendars in embodiments of the present disclosure.

Turning now to FIG. 4, a flow diagram is provided that illustrates a method 400 for managing and synchronizing multiple calendars in accordance with an embodiment of the present disclosure. At least portions of method 400 may be enabled by, performed by, and/or carried out by devices and/or components included in operating environment 100 of FIG. 1A and/or calendar synchronization system 200 of FIG. 2. Some of the structured data discussed in conjunction with FIG. 1B may at least partially enable portions of method 400. Initially, as shown at block 402, the method manages at least a first and a second calendar. In at least one exemplary embodiment of method 400, the first calendar may be a work calendar, such as but not limited to work calendar 300 of FIG. 3A, and the second calendar may be a family calendar, such as but not limited to family calendar 350 of FIG. 3B. Various embodiments for managing calendars are discussed in conjunction with calendar manager 290 of system 200 of FIG. 2 and method 500 of FIG. 5A.

However, briefly, at block 402, the first and second calendars may be managed by a calendar manager, such as but not limited to calendar manager 290. Thus, at block 402, any of the tasks or functionalities of a calendar manager may be performed, such as but not limited to generating/updating the first and second calendars, generating/updating various synchronization profiles for the first and second calendars, and generating/updating calendar events for the first and second calendars. Additionally, at block 402, calendar permissions, such as but not limited to user read and write permissions, for both the first and second calendars, may be enforced.

At block 404, the first and second calendars are monitored. Various embodiments for monitoring calendars are discussed at least in conjunction with calendar event monitor 280 of system 200 of FIG. 2 and method 520 of FIG. 5B. However, briefly, at block 404, the first and second calendars may be monitored by a calendar monitor, such as but not limited to calendar event monitor 280. Thus, at block 404, any of the tasks or functionalities of a calendar monitor may be performed. For example, the generation and/or update of calendar events associated with the first or the second calendars may be detected. In response to detecting the generation and/or update of a calendar event for the first or the second calendar, other calendars to synchronize the detected event with may be located and/or accessed at block 404. Also at block 404, temporal and/or spatial conflicts between the detected event and other calendar events may be detected.

At block 406, any temporal and/or spatial conflicts detected at block 404 are mediated and/or resolved. Various embodiments for mediating conflicts are discussed at least in conjunction with event-conflict mediator 250 of system 200 of FIG. 2 and method 540 of FIG. 5C. However, briefly, at block 406, any of the tasks or functionalities of an event-conflict mediator may be performed. For example, at block 406, any temporal and/or spatial conflicts between a first event included in the first calendar and a second event included in the second calendar may be resolved, via the determination and recommendation of alternative dates, times, or locations for at least one of the first event or the second event. For example, at block 406, a conflict detected at block 404 may be analyzed and resolved, wherein the first and second events are events that an individual or particular user is interested in attending. Resolving a conflict may include providing recommended alternative dates, times, or locations for at least one of the events in conflict. In addition to resolving conflicts, events may be scheduled at block 406, and notification(s) pertaining to the scheduled events and resolved conflicts may be provided to users.

At block 408, the first and second calendars may be synchronized. Various embodiments for synchronizing calendars are discussed at least in conjunction with calendar synchronizer 260 of system 200 of FIG. 2 and method 560 of FIG. 5D. However, briefly, at block 408, any of the tasks or functionalities of a calendar synchronizer may be performed. For example, the relevant synchronization profiles for the first and second calendars may be located and/or accessed. At block 408, the event data of the event to be provided to each of the first and the second calendars may be determined based on the synchronization profiles. Likewise, the event data of the event to be restricted from each of the first and the second calendars may be determined based on the synchronization profiles. At block 408, the accessible portions of the event data may be selectively provided to each of the first and the second calendars. For instance, a comparison of FIGS. 3A and 3B shows the synchronization of a work calendar 300 and a family calendar 350. Also at block 408, one or more notifications may be provided to users of the first and second calendars.

Figure 5A:
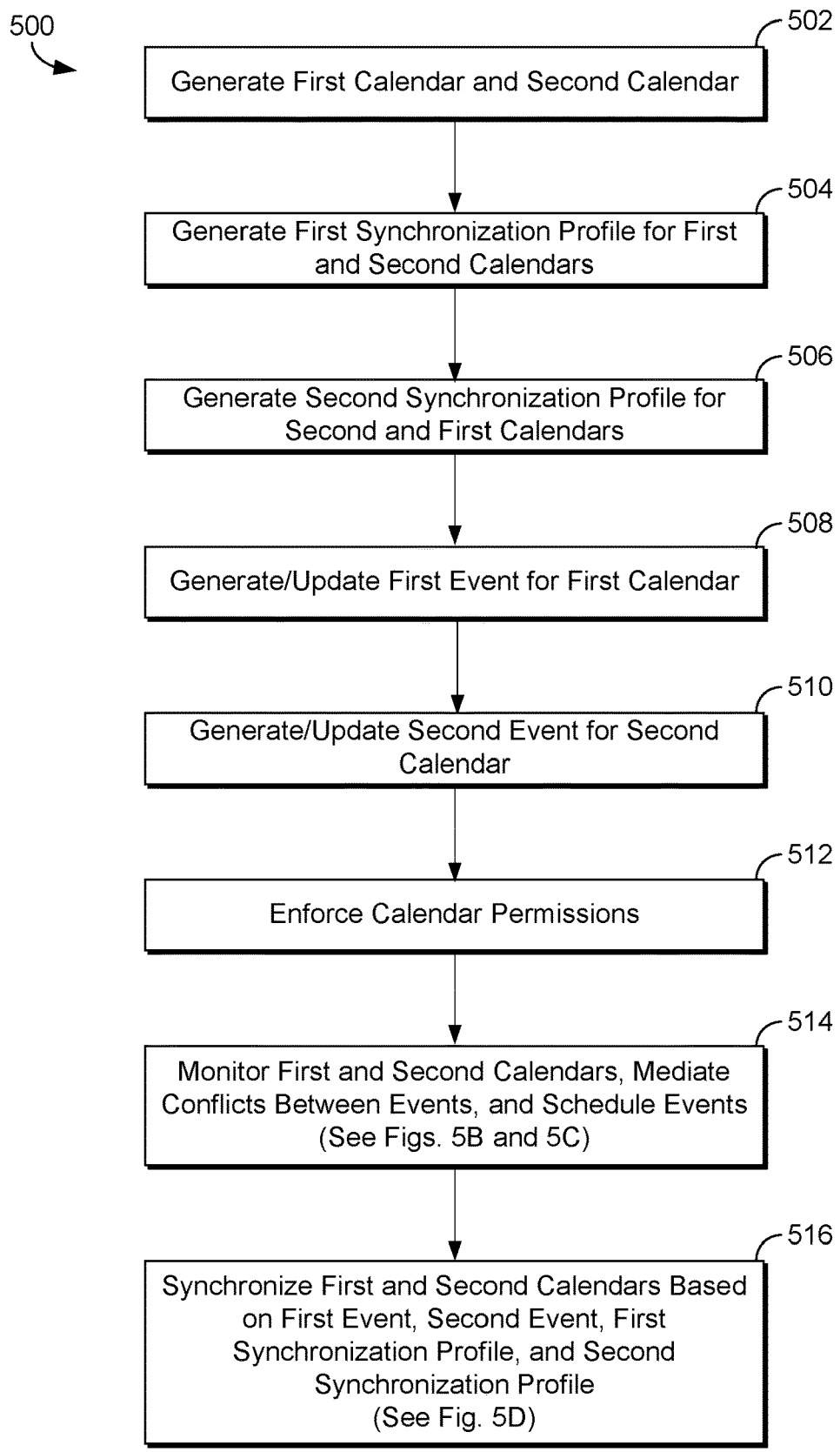

FIG. 5A illustrates a flow diagram for a method 500 for managing multiple calendars in accordance with an embodiment of the present disclosure. At least portions of method 500 may be enabled by, performed by, and/or carried out by devices and/or components included in operating environment 100 of FIG. 1A and/or calendar synchronization system 200 of FIG. 2. Some of the structured data discussed in conjunction with FIG. 1B may at least partially enable portions of method 500. Initially, as shown at block 502, a first and a second calendar is generated. For instance, a calendar generator, such as but not limited to calendar generator 292 of FIG. 2 may generate a work calendar, such as but not limited to work calendar 300 of FIG. 3A, and a family calendar, such as but not limited to family calendar 350 of FIG. 3B. Any of the other tasks or functionalities of a calendar generator may be performed at block 502.

At block 504, a first synchronization profile for the first and second calendars may be generated and/or updated. At block 506, a second synchronization profile for the first and second calendars may be generated and/or updated. The generated/updated first and second synchronization profiles may be at least similar to synchronization profile 160 of FIG. 1B. The first synchronization profile may indicate the first calendar as the primary calendar and the second calendar as a secondary calendar. In contrast, the second synchronization profile may indicate the second calendar as the primary calendar and the first calendar as a secondary calendar. A synchronization profile generator, such as but not limited to synchronization profile generator 294 of FIG. 2, may be employed to at least partially generate and/or update the synchronization profiles. Accordingly, an event and synchronization profile learner, such as but not limited to event and synchronization profile learner 270 of FIG. 2, may be employed to at least partially automate the generation/updating of synchronization profiles at blocks 504 and 506.

At block 508, a first event for the first calendar is updated and/or generated. At block 510, a second event for the second calendar is updated and/or generated. For instance, at blocks 508 and 510, a first event for work calendar 300 may be generated and/or updated and a second event for family calendar 350 may be generated and/or updated. Any event generator, such as but not limited to event generator/updater 296, may generate the events. The generated events may be encoded in structured data, such as but not limited to calendar event 140 of FIG. 1B. At block 512, the calendar permissions of each of the first and second calendars may be enforced. The calendar permissions may be enforced by a calendar permissions enforcer, such as but not limited to calendar permissions enforcer 298 of FIG. 2. Such permissions may be found in a list of users and permissions, such as but not limited to user list and permissions 124 of FIG. 1B.

At block 514, the first and second calendars are monitored. The calendars may be monitored by a calendar monitor, such as but not limited to calendar event monitor 280. Various embodiments for monitoring calendars are discussed in conjunction with at least calendar event monitor 280 and method 520 of FIG. 5B. In addition, at block 514, event conflicts may be mediated and resolved. Furthermore, events may be scheduled. Conflicts may be mediated and resolved by an event-conflict mediator, such as but not limited to event-conflict mediator 250 of FIG. 2. Events may be scheduled by such an event-conflict mediator. Various embodiments for scheduling events, as well as mediating and resolving conflicts are discussed in conjunction with at least event-conflict mediator 250 and method 540 of FIG. 5C.

At block 516, the first and second calendars are synchronized. The calendars may be synchronized via a calendar synchronizer, such as but not limited to calendar synchronizer 260 of FIG. 2. Various embodiments for synchronizing calendars are discussed in conjunction with calendar synchronizer 260 and method 560 of FIG. 5D. However, briefly here, the calendars may be synchronized based on the first event, the second event, the first synchronization profile, and the second synchronization profile. FIGS. 3A and 3B show a first calendar and a second calendar synchronized.

Figure 5B:
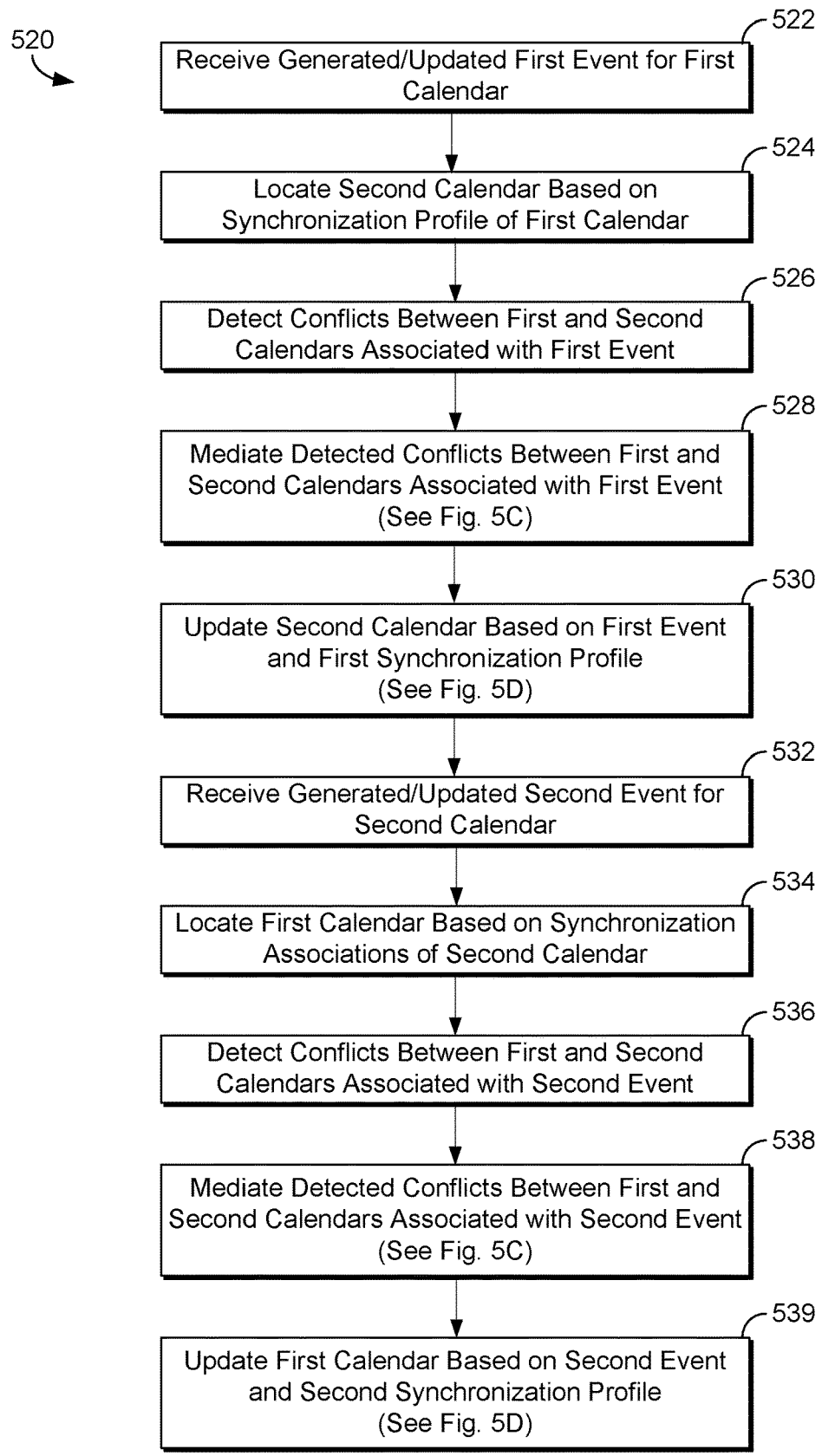

FIG. 5B illustrates a flow diagram for a method 520 for monitoring multiple calendars in accordance with an embodiment of the present disclosure. At least portions of method 500 may be enabled by, performed by, and/or carried out by devices and/or components included in operating environment 100 of FIG. 1A and/or calendar synchronization system 200 of FIG. 2. Some of the structured data discussed in conjunction with FIG. 1B may at least partially enable portions of method 520. Initially, as shown at block 522, a first event for a first calendar may be received. For instance, an event generation/update detector, such as but not limited to event generation/update detector 282 of FIG. 2, may detect, or otherwise receive, a generated/updated first event for a work calendar, such as but not limited to work calendar 300 of FIG. 3A.

At block 524, a second calendar is located and/or accessed based on a synchronization profile for the first calendar. For instance, a calendar locator, such as but not limited to calendar locator 284 of FIG. 2, may locate a second calendar, such as but not limited to family calendar 350 of FIG. 3B. At block 526, a conflict may be detected between the first and second calendars associated with the first event. For instance, an event-conflict detector, such as but not limited to event-conflict detector 286 of FIG. 2, may detect a temporal and/or spatial conflict between the first event of the first calendar and a second event of the second calendar.

At block 528, the detected conflict between the first and second calendars associated with the event may be mediated. For example, an event-conflict mediator, such as but not limited to event-conflict mediator 250 of FIG. 2, may mediate and resolve the conflict. Various embodiments of mediating and resolving conflicts between events are discussed at least in conjunction with event-conflict mediator 250 and method 540 of FIG. C.

At block 530, the second calendar may be updated based on the first event and the first synchronization profile. For example, a calendar synchronizer, such as calendar synchronizer 260, may update the second calendar. Various embodiments of updating calendars based on synchronizing or sharing events are discussed in conjunction with at least calendar synchronizer 260 and method 560 of FIG. 5D.

At block 532, a second event for the second calendar may be received. For the event received at block 532, the second calendar may be the primary calendar and the first calendar is a secondary calendar. At block 534, the first calendar may be located based on a synchronization profile that indicates the second calendar as the primary calendar and the first calendar as a secondary calendar. At block 536, conflict between the first and second calendars may be detected. At block 538, similar to block 528, such conflicts may be resolved and further events may be scheduled. At block 539, the first calendar may be updated. That is, the second event may be shared with the first calendar based on the second synchronization profile.

Figure 5C:
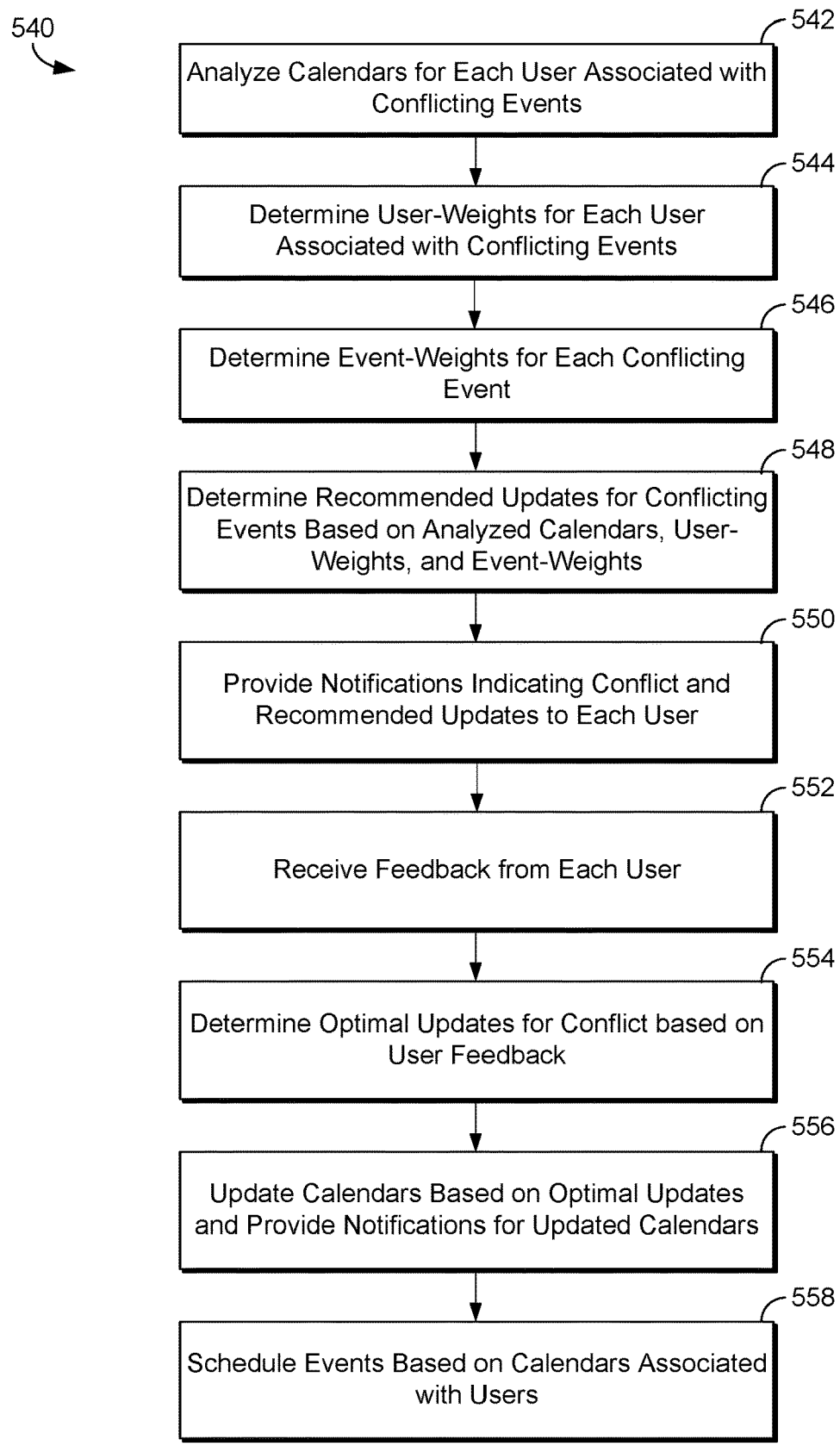

FIG. 5C illustrates a flow diagram for a method 540 for mediating and resolving events between calendars and scheduling events in accordance with an embodiment of the present disclosure. At least portions of method 540 may be enabled by, performed by, and/or carried out by devices and/or components included in operating environment 100 of FIG. 1A and/or calendar synchronization system 200 of FIG. 2. Some of the structured data discussed in conjunction with FIG. 1B may at least partially enable portions of method 540. Initially, as shown at block 542, each calendar for each user associated with the events that have been detected to be in conflict are analyzed. For instance, a conflict analyzer, such as but not limited to conflict analyzer 252 of FIG. 2, may analyze each calendar for each user associated with the two or more events that the event-conflict detector has detected to be in conflict.

At block 544, user-weights for each user associated with the conflicting events are determined. At block 546, event-weights for each conflicting event are determined. The conflict analyzer may determine the user-weights and/or the event-weights. At block 548, recommended updates for conflicting events are determined based on the analyzed calendars, user-weights, and event-weights. Recommended updates for the conflicting events may include at least one of an alternative date, an alternative start time, an alternative stop time, an alternative duration, or an alternative for at least one of the conflicting events. The recommended updates may resolve the conflict. A conflict-resolution generator, such as but not limited to conflict-resolution generator 254 of FIG. 2, may determine and/or generate the recommended updates.

At block 550, one or more notifications indicating the conflict and the recommended updates are provided to each user. Conflict/resolution notifier 256 of FIG. 2 may provide the notifications. At block 552, feedback regarding the recommended updates may be received from at least a portion of the users. At block 554, optimal updates for the conflicting events are determined based on the user feedback. At block 556, the calendars are updated based on the optimal updates. Synchronization calendar updater 266 may be employed to update the calendars. At block 558, one or more events may be scheduled. An event scheduler, such as but not limited to event scheduler 258 of FIG. 2, may schedule the one or more events. Scheduling the events may be based on the user-weights and/or the event-weights.

Figure 5D:
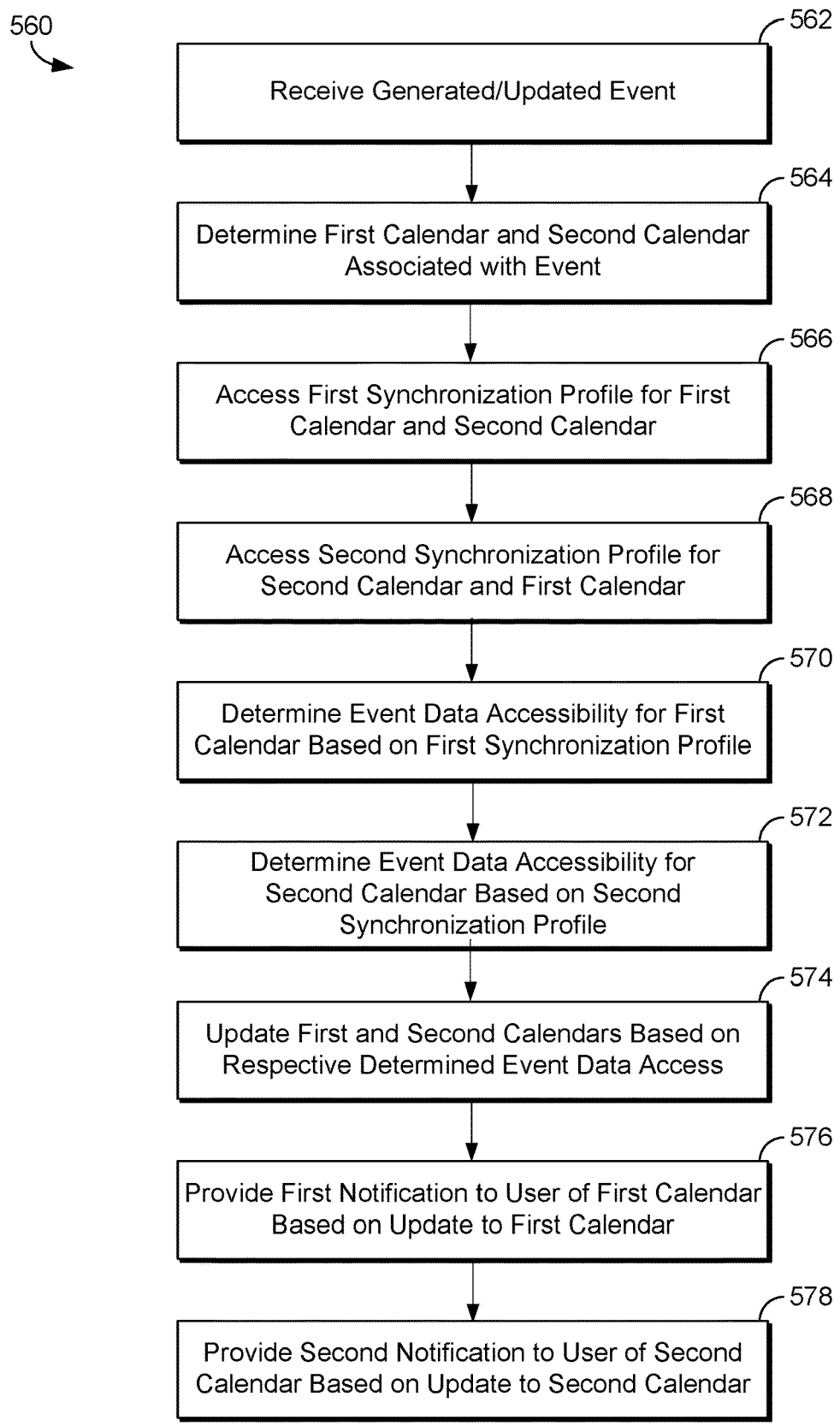

FIG. 5D illustrates a flow diagram for a method 560 for synchronizing multiple calendars in accordance with an embodiment of the present disclosure. At least portions of method 560 may be enabled by, performed by, and/or carried out by devices and/or components included in operating environment 100 of FIG. 1A and/or calendar synchronization system 200 of FIG. 2. Some of the structured data discussed in conjunction with FIG. 1B may at least partially enable portions of method 560. Initially, as shown at block 562, a generated/updated event is received. In various embodiments, a generated/updated event may be detected at block 562. Various embodiments of receiving and/or detecting a generated/updated event are discussed in conjunction with at least event generation/update detector 282 and method 520 of FIG. 5B. An event may be received and/or detected by a calendar event monitor, such as but not limited to calendar event monitor 280 of FIG. 2.

At block 564, a first and a second calendar that are associated with the received event are determined. For instance, a calendar locator, such as but not limited to calendar locator 284 of FIG. 2, may consult a list of associated calendars encoded in data that is included with the event. At block 566, a first synchronization profile for the first and second calendars is accessed. At block 568, a second synchronization profile for the first and second calendars is accessed. For instance, the first synchronization profile may indicate the first calendar as the primary calendar and the second calendar as a secondary calendar. The second synchronization profile may indicate the second calendar as the primary calendar and the first calendar as a secondary calendar. In one embodiment, a synchronization profiler, such as synchronization profiler 262 of FIG. 2, may access the synchronization profiles.

At block 570, the event data accessibility for the first calendar is determined based on the first synchronization profile. At block 572, the event data accessibility for the second calendar is determined based on the second synchronization profile. In one embodiment, synchronization profiler 262 may determine the event data accessibility by parsing the synchronization profiles. At block 574, the first and second calendars are updated based on the determined event access for the respective calendars. A synchronization calendar updater, such as but not limited to synchronization calendar updater 266 of FIG. 2, may update the first and second calendars. At block 576, a first notification based on the updating of the first calendar may be provided to a user of the first calendar. At block 578, a second notification based on the updating of the second calendar may be provided to a user of the second calendar. A synchronization notifier, such as synchronization notifier 268 of FIG. 2, may be employed to provide the notifications to the users.

Accordingly, we have described various aspects of technology that provide added levels of information inferred from calendar event items and personalized computing experiences based on this information, improved performance of personal digital assistants, and increased efficiency of computing resource usage and network bandwidth usage. It is understood that various features, sub-combinations, and modifications of the embodiments described herein are of utility and may be employed in other embodiments without reference to other features or sub-combinations. Moreover, the order and sequences of steps shown in the example methods 400, 500, 520, 540, and 560 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 6:
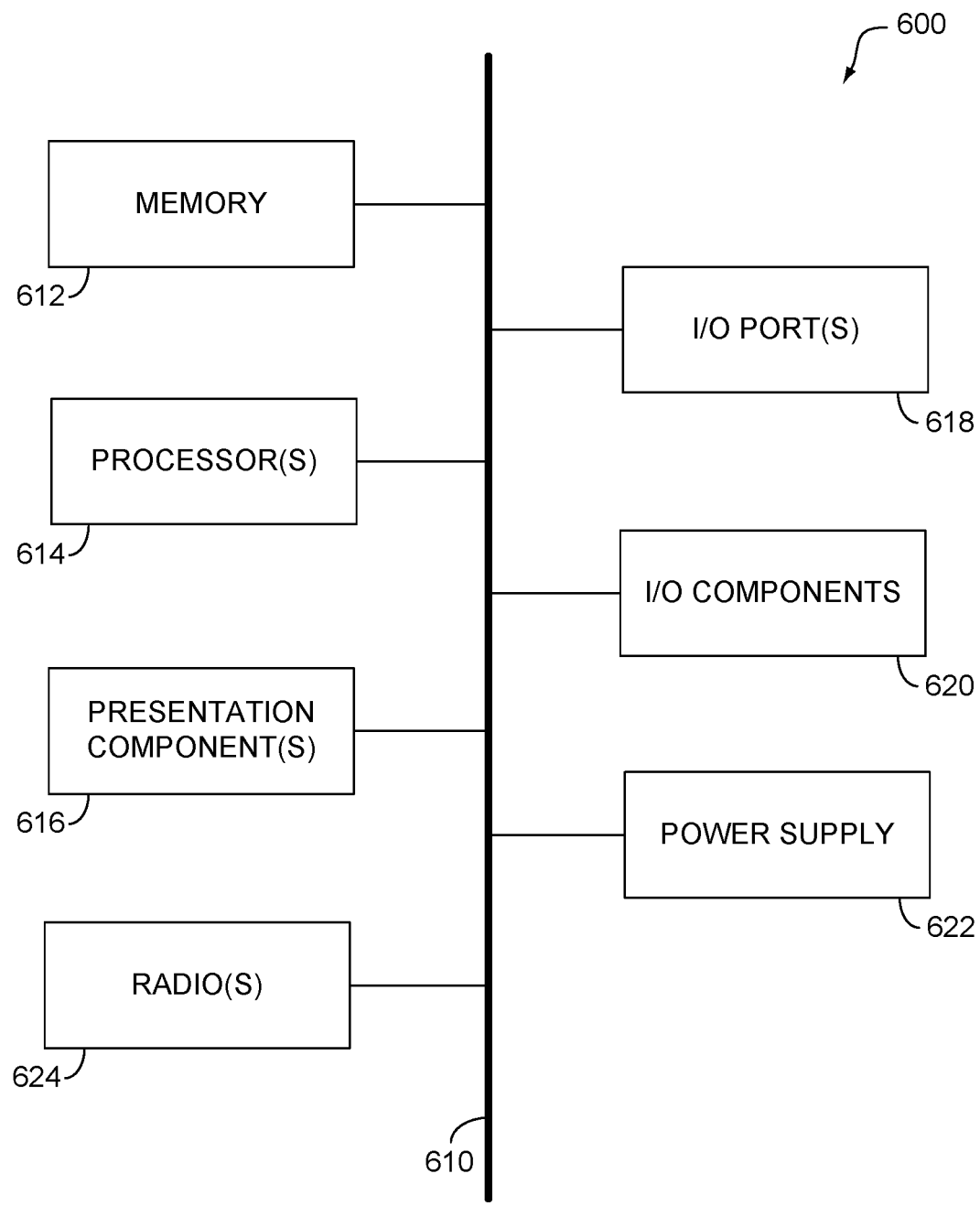
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. In some implementations, presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system for enforcing security of event data when synchronizing calendars, the system comprising:
   one or more processors; and
   computer storage memory having computer-executable instructions stored thereon which, when executed by the one or more processors, implement a method comprising:
   obtaining monitored data from monitoring activity via one or more user devices associated with a user to detect calendar activity associated with a set of calendars in a data store, wherein the monitored data comprises user activity, user preferences, synchronization events, calendar event data, a calendar context, an event context, or a user device context;
   applying pattern inference logic of a machine learning process, comprising rules, associations, conditions, a prediction model, a classification model, or a pattern inference algorithm, to the monitored data to determine synchronization patterns or features;
   dynamically updating a synchronization profile of a first calendar in the set of calendars, wherein the synchronization profile is learned over time, based at least in part on the synchronization patterns or features determined by the pattern inference logic, wherein the synchronization profile indicates accessibility, by particular calendars in the set of calendars, to selective portions of event data associated with the first calendar;
   detecting a first event that is a first calendar event, comprising first event data, wherein the first event is associated with the first calendar;
   determining a second calendar based on at least one of the user activity, the first calendar, or the first event, wherein the second calendar is included in the set of calendars;
   determining that one or more items of the first event data in the first event are accessible to the second calendar based on the synchronization profile associated with the first calendar, the synchronization profile providing accessibility settings for respective items of the first event data, each accessibility setting indicating whether the respective item of the first event data is accessible or non-accessible to the second calendar;
   generating a scrubbed first event to be synchronized with the second calendar, the scrubbed first event generated by scrubbing the first event data based at least in part on the accessibility settings in the synchronization profile; and
   updating the second calendar to display the scrubbed first event.

2. The system of claim 1, wherein a portion of the first event data included in the first event is displayed in the first calendar and access to the portion of the first event data is selectively restricted from the second calendar.

3. The system of claim 1, wherein the method further comprises:
   in response to updating the second calendar, providing, to a user that is enabled to view the second calendar, a notification that the second calendar includes the first event.

4. The system of claim 1, wherein the method further comprises:
   determining a location of the first event; and
   updating at least one of a start time or a stop time of the first event based on the location of the first event.

5. The system of claim 1, wherein the method further comprises:
   detecting a second event included in the second calendar;
   detecting a conflict between the first event and the second event; and
   providing a suggestion, to the user, of at least one alternative date, time, or location for at least one of the first event or the second event, wherein the at least one of the alternative date, time, or location resolves the conflict between the first event and the second event.

6. The system of claim 1, wherein the method further comprises:
   determining a first schedule based on the first calendar;
   determining a second schedule based on the second calendar; and
   determining at least one of a date, a time, or a location for a second event based on the first schedule and the second schedule.

7. The system of claim 1, wherein the method further comprises:
   in response to determining the second calendar, providing the user an option to include the first event in the second calendar; and
   in response to receiving a user selection of the option, updating the second calendar to include the first event.

8. The system of claim 1, wherein the method further comprises:

detecting an update to the first event that includes at least one of an update to a date, a start time, a stop time, or a location of the first event; and updating the second calendar to include the update to the first event.

9. The system of claim 1, wherein the method further comprises:

determining a shared portion of the first event data included in the first event based on at least one of a context of the first event, a context of the first calendar, or the user activity;

determining a restricted portion of the first event data included in the first event based on at least one of the context of the first event, the context of the first calendar, or the user activity;

providing each of the first calendar and the second calendar the shared portion of the first event data;

providing the first calendar the restricted portion of the first event data; and restricting the second calendar from accessing the restricted portion of the first event data.

10. The system of claim 1, wherein the method further comprises:

determining a first weight associated with a first user of the first calendar;

determining a second weight associated with a second user of the second calendar; and scheduling a second event based on the first calendar, the second calendar, the first weight associated with the first user, and the second weight associated with the second user.

11. The system of claim 1, wherein the method further comprises:

determining a first weight associated with the first event;

determining a second weight associated with a second event that is included in the second calendar; and scheduling a third event based on the first calendar, the second calendar, the first weight associated with the first event, and the second weight associated with the second event.

12. The system of claim 1, wherein determining the second calendar is based on the synchronization profile associated with the first calendar.

13. The system of claim 1, wherein dynamically updating the synchronization profile of the first calendar thereby reduces, over time, manual effort required for calendar synchronization.

14. The system of claim 1, wherein dynamically updating the synchronization profile of the first calendar comprises using the machine learning process that learns synchronization preferences of the user over time at least in part from the monitored data.

15. A computerized method for enforcing security of event data during calendar synchronization, the method comprising:

providing a synchronization profile of a first calendar, the synchronization profile providing a list of rules, heuristics, or policies that restrict or allow access, by calendars in a set of calendars, to selective portions of event data associated with the first calendar;

obtaining monitored data from monitoring activity via one or more user devices to detect calendar activity associated with the set of calendars in a data store, wherein the monitored data comprises user activity, user preferences, synchronization events, calendar event data, a calendar context, an event context, or a user device context;

applying pattern inference logic of a machine learning process, comprising rules, associations, conditions, a prediction model, a classification model, or a pattern inference algorithm, to the monitored data to determine synchronization patterns or features;

dynamically updating the synchronization profile, wherein the synchronization profile is learned over time, based at least in part on the synchronization patterns or features determined by the pattern inference logic;

generating a calendar-event data accessibility map, based at least in part on the synchronization profile, that includes, for respective calendars in the set of calendars, an accessibility setting for each item of event data included in individual events in the first calendar indicating whether to make the item of event data accessible to the respective calendar;

detecting a first event that is a calendar event, comprising first event data, wherein the first event is associated with the first calendar;

determining a second calendar based on at least one of user activity, the first calendar, or the first event, wherein the second calendar is included in the set of calendars;

determining that a first item of the first event data in the first event is accessible to the second calendar, and a second item of the first event data is restricted from access by the second calendar, based on accessing corresponding accessibility settings in the calendar-event data accessibility map; and updating the second calendar to display the first item of the first event data in the first event, without displaying the second item of the first event data, as determined from the calendar-event data accessibility map.

16. The computerized method of claim 15, further comprising:

detecting a second event included in the second calendar;

detecting a conflict between the first event and the second event; and providing a suggestion, to a user, of at least one alternative date, time, or location for at least one of the first event or the second event, wherein the at least one of the alternative date, time, or location resolves the conflict between the first event and the second event.

17. The computerized method of claim 15, further comprising:

detecting an update to the first event that includes at least one of an update to a date, a start time, a stop time, or a location of the first event; and updating the second calendar to include the update to the first event.

18. The computerized method of claim 15, further comprising:

determining a shared portion of the first event data included in the first event based on at least one of a context of the first event, a context of the first calendar, or the user activity;

determining a restricted portion of the first event data included in the first event based on at least one of the context of the first event, the context of the first calendar, or the user activity;

providing each of the first calendar and the second calendar the shared portion of the first event data;

providing the first calendar the restricted portion of the first event data; and restricting the second calendar from accessing the restricted portion of the first event data.

19. One or more computer-storage media having instructions stored thereon, wherein the instructions, when executed by a processor of a computing device, cause the computing device to perform actions for enforcing security of event data when synchronizing calendars, the actions including:
- obtaining monitored data from monitoring activity via one or more user devices associated with a user to detect calendar activity associated with a set of calendars in a data store, wherein the monitored data comprises user activity, user preferences, synchronization events, calendar event data, a calendar context, an event context, or a user device context;
- applying pattern inference logic of a machine learning process, comprising rules, associations, conditions, a prediction model, a classification model, or a pattern inference algorithm, to the monitored data to determine synchronization patterns or features;
- dynamically updating a synchronization profile of a first calendar in the set of calendars, wherein the synchronization profile is learned over time, based at least in part on the synchronization patterns or features determined by the pattern inference logic, thereby reducing, over time, manual effort required for calendar synchronization, the synchronization profile indicating accessibility, by particular calendars in the set of calendars, to selective portions of event data associated with the first calendar;
- detecting a first event that is a calendar event, comprising first event data, wherein the first event is associated with the first calendar;
- determining a second calendar based on at least one of the user activity, the first calendar, or the first event, wherein the second calendar is included in the set of calendars;
- determining that a first item of the first event data in the first event is accessible to the second calendar, and second item of the first event data is non-accessible to the second calendar, based on the synchronization profile associated with the first calendar, the synchronization profile providing accessibility settings for respective items of the first event data, each accessibility setting indicating whether the respective item of the first event data is accessible or non-accessible to the second calendar; and
- updating the second calendar to display the first item of the first event data in the first event, wherein access to the second item of the first event data is restricted from the second calendar, as determined at least in part from the synchronization profile.

20. The one or more computer-storage media of claim 19, the actions further comprising:
- determining a first schedule based on the first calendar;
- determining a second schedule based on the second calendar; and
- determining at least one of a date, a time, or a location for a second event based on the first schedule and the second schedule.

* * * * *